(12) United States Patent
Wang et al.

(10) Patent No.: US 11,969,097 B2
(45) Date of Patent: Apr. 30, 2024

(54) INFLATABLE PRODUCT

(71) Applicant: INNOVATOR PLASTIC & ELECTRONICS (HUIZHOU) COMPANY LIMITED, Huizhou (CN)

(72) Inventors: Cheng-Chung Wang, Huizhou (CN); Chien-Hua Wang, Huizhou (CN); Yao-Hua Wang, Huizhou (CN)

(73) Assignee: INNOVATOR PLASTIC & ELECTRONICS (HUIZHOU) CO LTD, Huizhou (CN)

( * ) Notice: Subject to any disclaimer, the term of this patent is extended or adjusted under 35 U.S.C. 154(b) by 367 days.

(21) Appl. No.: 17/154,796

(22) Filed: Jan. 21, 2021

(65) Prior Publication Data
US 2021/0219739 A1    Jul. 22, 2021

(30) Foreign Application Priority Data
Jan. 21, 2020    (CN) .......................... 202010072252.0

(51) Int. Cl.
| | |
|---|---|
| *A47C 27/00* | (2006.01) |
| *A47C 27/08* | (2006.01) |
| *B32B 5/02* | (2006.01) |
| *B32B 7/09* | (2019.01) |
| *B32B 7/12* | (2006.01) |
| *B32B 27/12* | (2006.01) |
| *B32B 27/30* | (2006.01) |
| *B63B 7/08* | (2020.01) |

(52) U.S. Cl.
CPC .......... *A47C 27/081* (2013.01); *A47C 27/007* (2013.01); *A47C 27/087* (2013.01); *B32B 5/02* (2013.01); *B32B 7/09* (2019.01); *B32B 7/12* (2013.01); *B32B 27/12* (2013.01); *B32B 27/304* (2013.01); *B32B 2307/724* (2013.01); *B32B 2479/00* (2013.01); *B32B 2605/12* (2013.01); *B63B 7/08* (2013.01)

(58) Field of Classification Search
CPC ....... A47C 27/00; A47C 27/08; A47C 27/081; A47C 27/007; A47C 27/087
See application file for complete search history.

(56) References Cited

U.S. PATENT DOCUMENTS

| | | | |
|---|---|---|---|
| 6,220,629 B1 | 4/2001 | Wipasuramonton et al. | |
| 6,839,922 B1 * | 1/2005 | Foggett | A47C 27/081 219/217 |
| 2007/0124864 A1 * | 6/2007 | Lau | A47C 27/081 5/711 |
| 2010/0320736 A1 | 12/2010 | Traber et al. | |
| 2015/0335164 A1 * | 11/2015 | Liu | F24F 1/022 156/278 |

(Continued)

FOREIGN PATENT DOCUMENTS

| | | |
|---|---|---|
| CN | 202336003 U | 7/2012 |
| CN | 207784763 U | 8/2018 |

(Continued)

*Primary Examiner* — Fredrick C Conley

(57) ABSTRACT

An inflatable product includes an inflatable chamber and a supplemental layer. The supplemental layer is disposed on the inflatable chamber. Further, the supplemental layer is directly or indirectly fixed to the inflatable chamber by sewing. The inflatable chamber is made of plastic. The material of the supplemental layer is different from that of the inflatable chamber.

47 Claims, 21 Drawing Sheets

(56) References Cited

U.S. PATENT DOCUMENTS

| | | | |
|---|---|---|---|
| 2018/0027986 A1* | 2/2018 | Schulte | A47C 27/085 |
| 2018/0119320 A1* | 5/2018 | Candrian-Bell | A47C 27/081 |
| 2019/0069691 A1* | 3/2019 | Liu | A45F 3/00 |
| 2020/0100598 A1* | 4/2020 | Huang | A47C 27/087 |

FOREIGN PATENT DOCUMENTS

| | | |
|---|---|---|
| CN | 110432702 A | 11/2019 |
| WO | WO2011089902 A1 | 7/2011 |

* cited by examiner

INFLATABLE PRODUCT

CROSS REFERENCE TO RELATED APPLICATIONS

This application claims the right of priority under 35 U.S.C. § 119 of China Patent Application CN 202010072252.0 filed on Jan. 21, 2020, which is incorporated by reference herein in its entirety.

BACKGROUND OF THE INVENTION

Field of the Invention

The invention relates to an inflatable product, and more particularly to an inflatable product with elements thereof connected by sewing and fusion.

Description of the Related Art

Referring to FIGS. 1 and 2, FIG. 1 is a perspective view of a conventional air mattress and FIG. 2 is a sectional view of the air mattress of FIG. 1. The air mattress 1 of FIG. 1 includes an inflatable chamber 11. The inflatable chamber 11 includes a top wall 110, a bottom wall 110' and a side wall 112. The top wall 110, the bottom wall 110' and the side wall 112, generally made of plastic material such as Polyvinyl Chloride (PVC), are connected to each other by fusion to form the inflatable chamber 11. In FIG. 2, reference numerals 102 indicate where the top wall 110, the bottom wall 110' and the side wall 112 are fused.

It is noted that a plurality of straps 14 are provided in the inflatable chamber 11 and are connected to the top wall 110, the bottom wall 110' and the side wall 112 by fusion. When the inflatable chamber 11 is inflated to expand, the stretch of the top wall 110, the bottom wall 110' and the side wall 112 is limited by the straps 14 (under the pulling forces of the straps 14), thereby controlling expansion of the inflatable chamber 11 to a desired shape.

Under the action of the straps 14, however, the top wall 110 and the bottom wall 110' inevitably have a plurality of first depressions 113 and second depressions 113' formed thereon so that the air mattress 1 is not flat at the top and bottom and user's comfort is affected.

BRIEF SUMMARY OF THE INVENTION

The invention provides an inflatable product. The inflatable product in accordance with an exemplary embodiment of the invention comprises an inflatable chamber and a supplemental layer directly or indirectly fixed to the inflatable chamber by sewing.

In another exemplary embodiment, the inflatable product further comprises a strap wherein the inflatable chamber comprises a first wall, a second wall and a third wall, the third wall connected between the first wall and the second wall; the strap is disposed in the inflatable chamber and connected to the first wall and the second wall; the first wall is pulled by the strap to form at least one first depression when the inflatable chamber is inflated; and the supplemental layer is a first air permeable layer covering the first depression.

In yet another exemplary embodiment, the first air permeable layer comprises netting or fabric.

In another exemplary embodiment, the inflatable product further comprises a trim sheet wherein the first wall comprises a first edge portion; the third wall comprises a second edge portion; the first air permeable layer comprises a third edge portion; the trim sheet is wrapped around the first edge portion and the third edge portion; and the trim sheet, the first edge portion and the third edge portion are fixed together by sewing.

In yet another exemplary embodiment, the trim sheet and the third wall are integrally formed as one continuous piece.

In another exemplary embodiment, the inflatable product further comprises a trim sheet wherein the first wall comprises a first edge portion; the third wall comprises a second edge portion; the first air permeable layer comprises a third edge portion; the trim sheet is wrapped around the second edge portion and the third edge portion; and the trim sheet, the second edge portion and the third edge portion are fixed together by sewing.

In yet another exemplary embodiment, the inflatable product further comprises a trim sheet wherein the first wall comprises a first edge portion; the third wall comprises a second edge portion; the first air permeable layer comprises a third edge portion; the trim sheet is wrapped around the first edge portion, the second edge portion and the third edge portion; and the trim sheet, the first edge portion, the second edge portion and the third edge portion are fixed together by sewing.

In another exemplary embodiment, the inflatable product further comprises a trim sheet wherein the first wall comprises a first edge portion; the third wall comprises a second edge portion; the first air permeable layer comprises a third edge portion; the first edge portion is wrapped around the third edge portion; the trim sheet is wrapped around the first edge portion and the third edge portion; and the trim sheet, the first edge portion and the third edge portion are fixed together by sewing.

In yet another exemplary embodiment, the second edge portion is also fixed together with the trim sheet, the first edge portion and the third edge portion by sewing.

In another exemplary embodiment, the inflatable product further comprises a trim sheet wherein the first wall comprises a first edge portion; the third wall comprises a second edge portion; the first air permeable layer comprises a third edge portion; the second edge portion is wrapped around the third edge portion; the trim sheet is wrapped around the second edge portion and the third edge portion; and the trim sheet, the second edge portion and the third edge portion are fixed together by sewing.

In yet another exemplary embodiment, the first edge portion is also fixed together with the trim sheet, the second edge portion and the third edge portion by sewing.

In another exemplary embodiment, the inflatable product further comprises a trim sheet wherein the first wall comprises a first edge portion; the third wall comprises a second edge portion; the first air permeable layer comprises a third edge portion; the first edge portion and the second edge portion wrap around the third edge portion; the trim sheet is wrapped around the first edge portion, the second edge portion and the third edge portion; and the trim sheet, the first edge portion, the second edge portion and the third edge portion are fixed together by sewing.

In yet another exemplary embodiment, the inflatable product further comprises a trim sheet and an auxiliary sheet wherein the first wall comprises a first edge portion; the third wall comprises a second edge portion; the first air permeable layer comprises a third edge portion; the auxiliary sheet is fused with the third wall; the trim sheet is wrapped around the third edge portion and to partially wrap around the auxiliary sheet; and the trim sheet, the third edge portion and the auxiliary sheet are fixed together by sewing.

In another exemplary embodiment, the inflatable product further comprises an auxiliary structure wherein the first wall comprises a first edge portion; the third wall comprises a second edge portion; the first air permeable layer comprises a third edge portion; the third edge portion is folded and fixed with the auxiliary structure by sewing; and the auxiliary structure is fused with the first edge portion and/or the second edge portion.

In yet another exemplary embodiment, the auxiliary structure comprises two auxiliary sheets one of which is fused with the first edge portion and/or the second edge portion.

In another exemplary embodiment, the auxiliary sheets are glued together.

In yet another exemplary embodiment, the inflatable product further comprises an auxiliary structure wherein the first wall comprises a first edge portion; the third wall comprises a second edge portion; the first air permeable layer comprises a third edge portion; the third edge portion is folded and fixed with the auxiliary structure by sewing; and the auxiliary structure is fixed with the first edge portion and/or the second edge portion by sewing.

In another exemplary embodiment, the auxiliary structure comprises two auxiliary sheets which are fixed with the first edge portion and/or the second edge portion by sewing.

In yet another exemplary embodiment, the auxiliary sheets are glued together.

In another exemplary embodiment, the inflatable product further comprises another strap which connects to the second wall and the third wall and comprises an edge wherein the edge is not directly connected to the third wall at a corner of the inflatable chamber.

In yet another exemplary embodiment, the inflatable product further comprises another strap which connects to the first wall and the third wall and comprises an edge wherein the edge is not directly connected to the third wall at a corner of the inflatable chamber.

In another exemplary embodiment, the inflatable product further comprises a trim sheet, a resilient layer and a first outermost fabric layer wherein the resilient layer is disposed between the first outermost fabric layer and the first air permeable layer; the trim sheet partially wraps around the first wall, the first air permeable layer and the first outermost fabric layer; and the trim sheet, the first wall, the first air permeable layer and the first outermost fabric layer are fixed together by sewing.

In yet another exemplary embodiment, the trim sheet and the third wall are integrally formed as one continuous piece.

In another exemplary embodiment, the inflatable product further comprises a trim sheet, a resilient layer and a first outermost fabric layer wherein the resilient layer is disposed between the first outermost fabric layer and the first air permeable layer; the trim sheet partially wraps around the third wall, the first air permeable layer and the first outermost fabric layer; and the trim sheet, the third wall, the first air permeable layer and the first outermost fabric layer are fixed together by sewing.

In yet another exemplary embodiment, the inflatable product further comprises a trim sheet, a resilient layer and a first outermost fabric layer wherein the resilient layer is disposed between the first outermost fabric layer and the first air permeable layer; the trim sheet partially wraps around the first wall, the third wall, the first air permeable layer and the first outermost fabric layer; and the trim sheet, the first wall, the third wall, the first air permeable layer and the first outermost fabric layer are fixed together by sewing.

In another exemplary embodiment, the inflatable product further comprises a trim sheet, an auxiliary sheet, a resilient layer and a first outermost fabric layer wherein the resilient layer is disposed between the first outermost fabric layer and the first air permeable layer; the auxiliary sheet is fused with the third wall; the trim sheet partially wraps around the auxiliary sheet, the first air permeable layer and the first outermost fabric layer; and the trim sheet, the auxiliary sheet, the first air permeable layer and the first outermost fabric layer are fixed together by sewing.

In yet another exemplary embodiment, the first air permeable layer comprises netting.

In another exemplary embodiment, the first air permeable layer, the resilient layer and the first outermost fabric layer are fixed together by sewing.

In yet another exemplary embodiment, the inflatable product further comprises another strap which connects to the second wall and the third wall and comprises an edge wherein the edge is not directly connected to the third wall at a corner of the inflatable chamber.

In another exemplary embodiment, the inflatable product further comprises another strap which connects to the first wall and the third wall and comprises an edge wherein the edge is not directly connected to the third wall at a corner of the inflatable chamber.

In yet another exemplary embodiment, the inflatable product further comprises a second air permeable layer which covers the second wall and is indirectly or directly fixed to the inflatable chamber by sewing.

In another exemplary embodiment, the second air permeable layer comprises netting or a fabric layer.

In yet another exemplary embodiment, the inflatable product further comprises a trim sheet wherein the second sheet, the third wall and the second air permeable layer are partially covered by the trim sheet; and the trim sheet, the second sheet, the third wall and the second air permeable layer are fixed together by sewing.

In another exemplary embodiment, the inflatable product further comprises a second outermost fabric layer wherein the second outermost fabric layer covers the third wall; the trim sheet further partially wrap around the second outermost fabric layer; and the trim sheet is further fixed to the third fabric sheet by sewing.

In yet another exemplary embodiment, the second outermost fabric layer and the third wall are glued together.

In another exemplary embodiment, the inflatable product further comprises a second outermost fabric layer wherein the second outermost fabric layer covers the third wall; and the trim sheet and the second outermost fabric layer are integrally formed as one continuous piece.

In yet another exemplary embodiment, the second outermost fabric layer and the third wall are glued together.

In another exemplary embodiment, the inflatable chamber comprises a fusion line; the supplemental layer is connected to the fusion line by sewing threads; and the sewing threads coincide with the fusion line.

In yet another exemplary embodiment, the supplemental layer comprises netting or fabric.

In another exemplary embodiment, the fusion line comprises an outer edge and an inner edge closer to an interior of the inflatable chamber than the outer edge; and the sewing threads are at least 2.5 mm away from the inner edge of the fusion line.

In yet another exemplary embodiment, the inflatable product further comprises a trim sheet wherein the fusion line is covered by the trim sheet.

In another exemplary embodiment, the trim sheet is fixed to the inflatable chamber by the sewing threads.

In yet another exemplary embodiment, the inflatable product inflatable product further comprises another inflatable chamber and an air permeable layer disposed thereon wherein the supplemental layer and the air permeable layer are sewed together.

In another exemplary embodiment, the inflatable chambers include a fusion line; and a location where the supplemental layer and the air permeable layer are sewed together is away from the fusion line.

In yet another exemplary embodiment, the inflatable product further comprises another inflatable chamber and a trim sheet wherein the inflatable chambers comprises a plurality of edge portions covered by the trim sheet; and the edge portions and the trim sheet are connected by sewing threads.

In another exemplary embodiment, the inflatable chambers further comprises a fusion line; and the sewing threads coincide with the fusion line.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
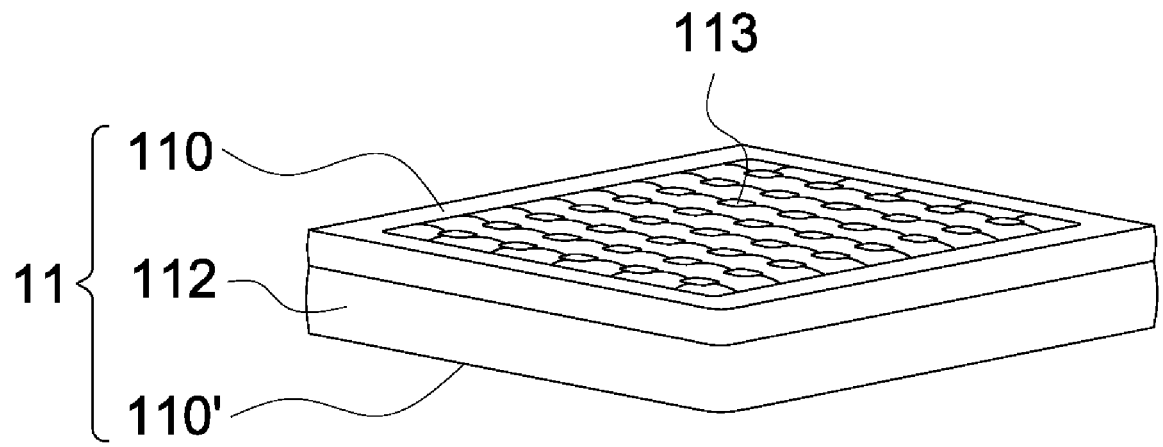
FIG. 1 is a perspective view of a conventional air mattress.
Figure 2:
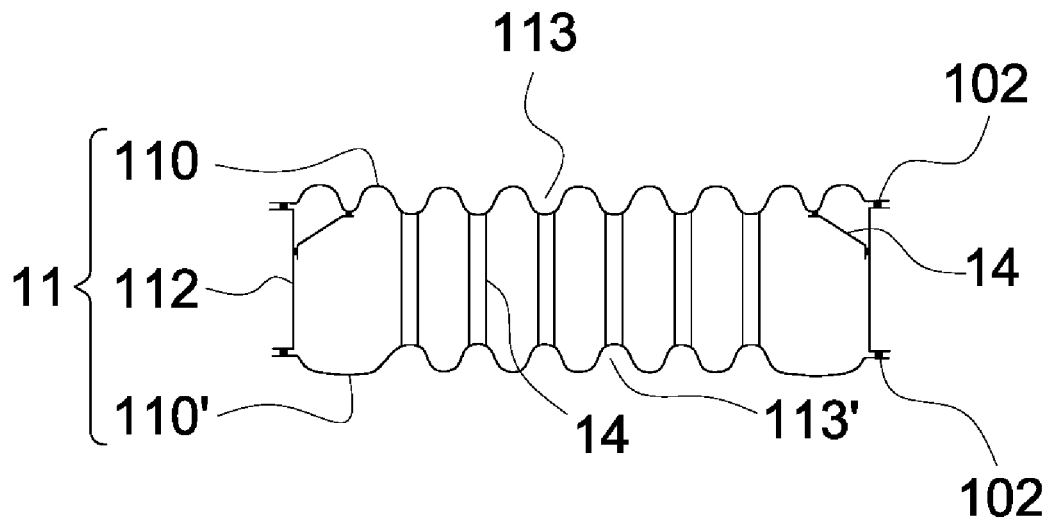
FIG. 2 is a sectional view of the air mattress of FIG. 1.
Figure 3:
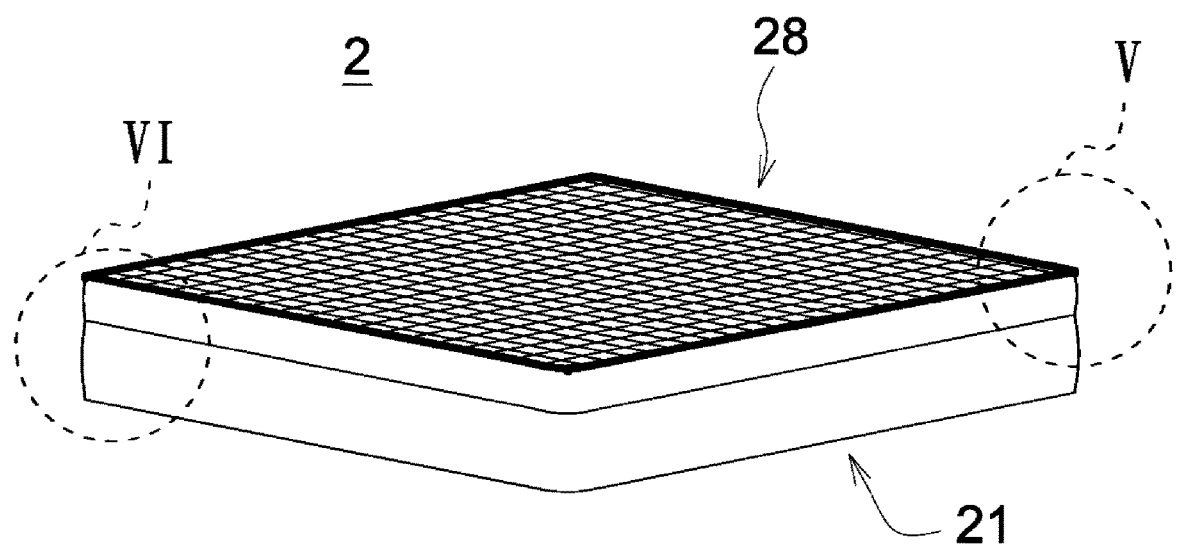
FIG. 3 is a perspective view of an air mattress in accordance with a first embodiment of the invention.
Figure 4:
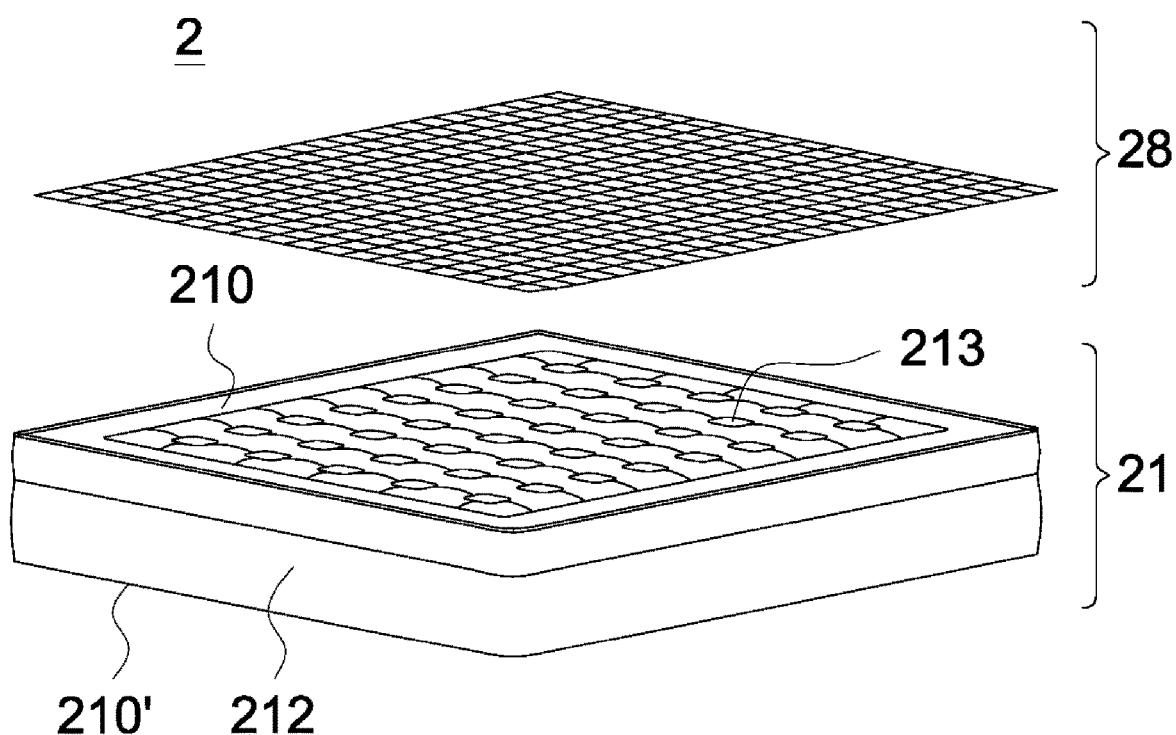
FIG. 4 is an exploded view of the air mattress of FIG. 3.
Figure 5A:
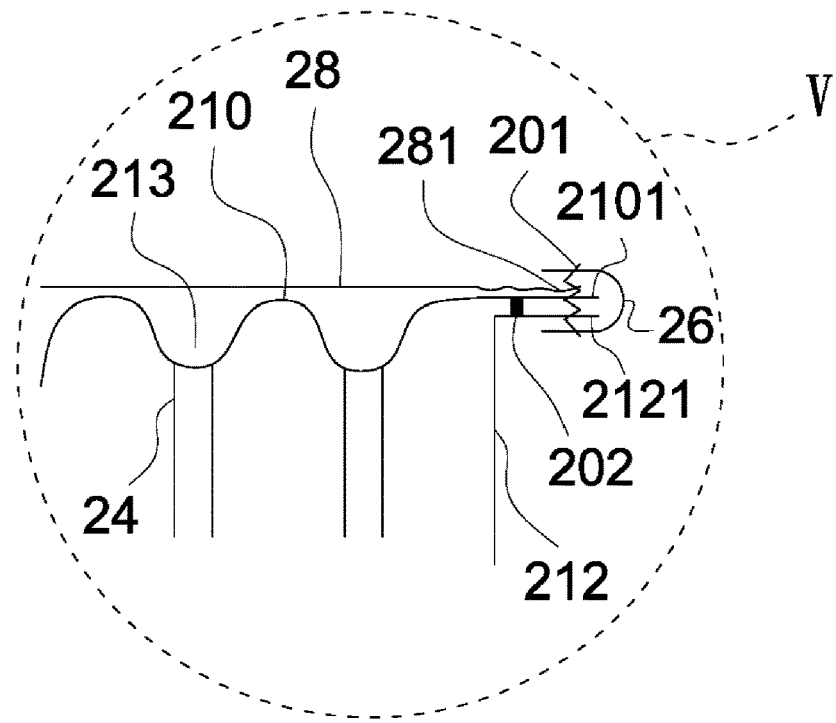
FIG. 5A is a local sectional view of the air mattress of FIG. 3.

Referring to FIGS. 3, 4 and 5A, FIG. 3 is a perspective view of an air mattress in accordance with a first embodiment of the invention, FIG. 4 is an exploded view of the air mattress of FIG. 3, and FIG. 5A is a local sectional view of the air mattress of FIG. 3. In the first embodiment, the air mattress 2 includes an inflatable chamber 21 and a first air permeable layer 28. The inflatable chamber 21 includes a first wall 210, a second wall 210' and a third wall 212. The first wall 210, the second wall 210' and the third wall 212 are connected to each other by fusion to form the inflatable chamber 21. FIG. 5A only shows one fusion as a representation and a dot 202 indicates where the fusion is. Further, in FIG. 5A, the first wall 210 is the top wall of the inflatable chamber 21 while the second wall 210' is the bottom wall of the inflatable chamber 21. However, that is only for easy description and the invention is not limited thereto. It is understood throughout this disclosure that the first wall 210 can be the bottom wall of the inflatable chamber 21 and the second wall 210' can be the top wall of the inflatable chamber 21. That will not be repeatedly emphasized in the following description.

A plurality of straps 24 are provided in the inflatable chamber 21 and are connected to the first wall 210, the second wall 210' and the third wall 212 by fusion. When the inflatable chamber 21 is inflated to expand, the stretch of the first wall 210, the second wall 210' and the third wall 212 is limited by the straps 24 (under the pulling forces of the straps 24), thereby controlling expansion of the inflatable chamber 21 to a desired shape.

Under the action of the straps 24, the first wall 210 and the second wall 210' have a plurality of first depressions 213 and second depressions (not shown) formed thereon. In the invention, a first air permeable layer 28 is additionally provided on the first wall 210 to cover the first depressions 213 thereby improving the flatness of the air mattress 2 and user's comfort.

Under the consideration of air permeability, support ability and manufacturing cost, the first air permeable layer 28 may be (for example) netting. However, the first wall 210, the second wall 210' and the third wall 212 are generally made of plastic (for example Polyvinyl Chloride, PVC). The differences between the qualities of net and plastic in terms of material make connection by fusion difficult and/or disadvantageous. In the invention, therefore, the first air permeable layer 28 is not connected to the inflatable chamber 21 by fusion but in another way, as described in the following.

Referring to FIG. 5A, the first wall 210 includes a first edge portion 2101. The third wall 212 includes a second edge portion 2121. The first air permeable layer 28 includes a third edge portion 281. The invention provides a trim sheet 26 to wrap around the first edge portion 2101, the second edge portion 2121 and the third edge portion 281. Then, the trim sheet 26, the first edge portion 2101, the second edge portion 2121 and the third edge portion 281 are fixed together by sewing (reference numeral 201 indicates the seam). It is understood that in this embodiment the first air permeable layer 28 is directly fixed to the inflatable chamber 21 by sewing.

It is noted that the first edge portion 2101, the second edge portion 2121 and the third edge portion 281 are covered by the trim sheet 26 so that the inflatable mattress of this embodiment can have an improved aesthetic appearance. The material of the trim sheet 26 may be fabric. Alternatively, the material of the trim sheet 26 may be plastic, so that the trim sheet 26, the first wall 210, the second wall 210' and the third wall 212 have the same material.

Figure 5B:
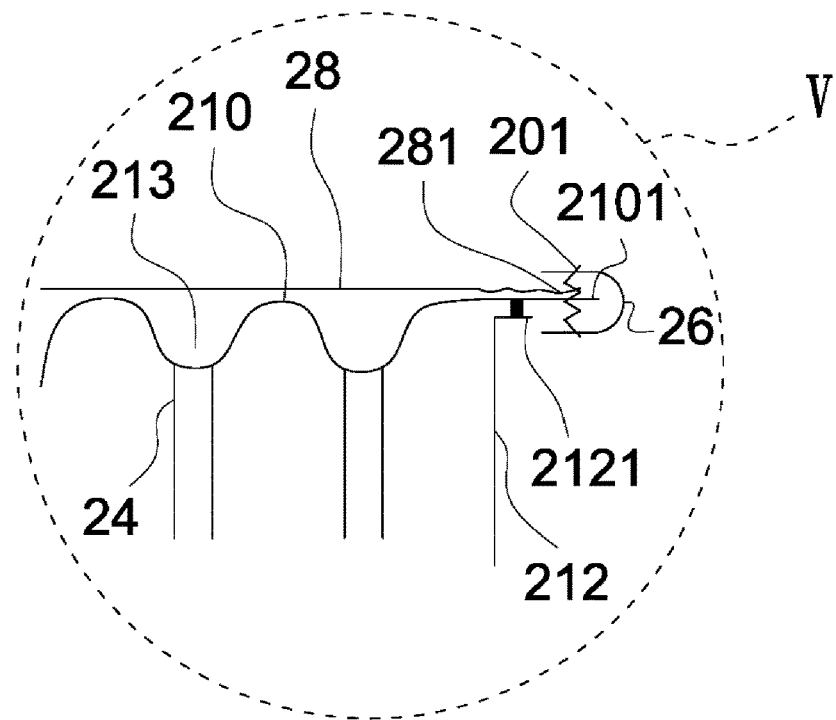
FIG. 5B is a sectional view of a part of an air mattress in accordance with a second embodiment of the invention.

FIG. 5B is a sectional view of a part of an air mattress in accordance with a second embodiment of the invention, wherein the second edge portion 2121 of the third wall 212 in the second embodiment protrudes beyond the fusion line 202 less than that in the first embodiment. Alternatively, the second edge portion 2121 of the third wall 212 in the second embodiment does not protrude beyond the fusion line 202 (not shown in figures). Thus, in the second embodiment, the second edge portion 212 is not covered by the trim sheet 26. Only the first edge portion 2101 and the third edge portion 281 are covered thereby.

Figure 5C:
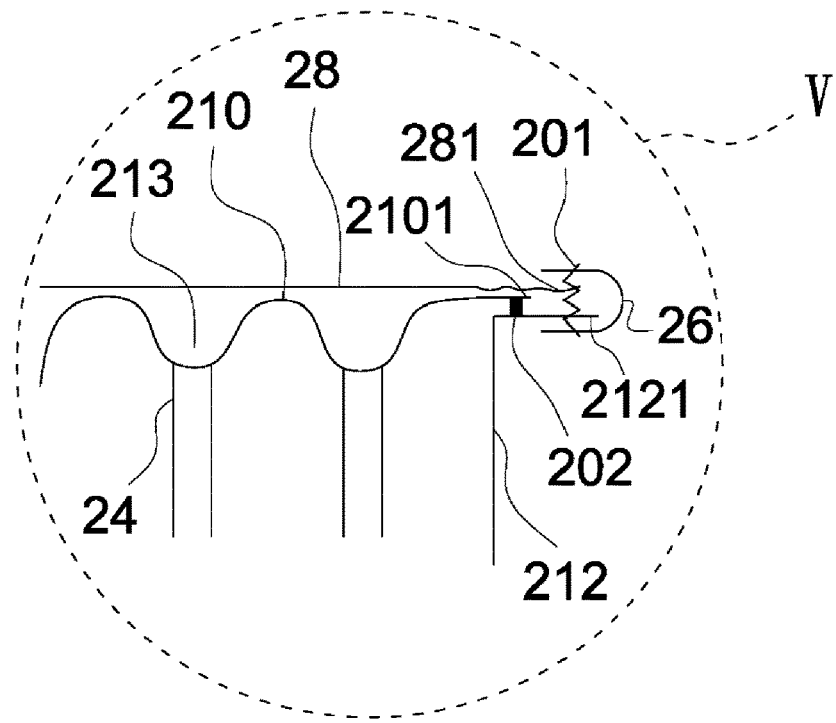
FIG. 5C is a sectional view of a part of an air mattress in accordance with a third embodiment of the invention.

FIG. 5C is a sectional view of a part of an air mattress in accordance with a third embodiment of the invention, wherein the first edge portion 2101 of the first wall 210 in the third embodiment protrudes beyond the fusion line 202 less than that in the first embodiment. Alternatively, the first edge portion 2101 of the first wall 210 in the third embodiment does not protrude beyond the fusion line 202 (not shown in figures). Thus, in the third embodiment, the first edge portion 2101 is not covered by the trim sheet 26. Only the second edge portion 2121 and the third edge portion 281 are covered thereby.

Figure 5D:
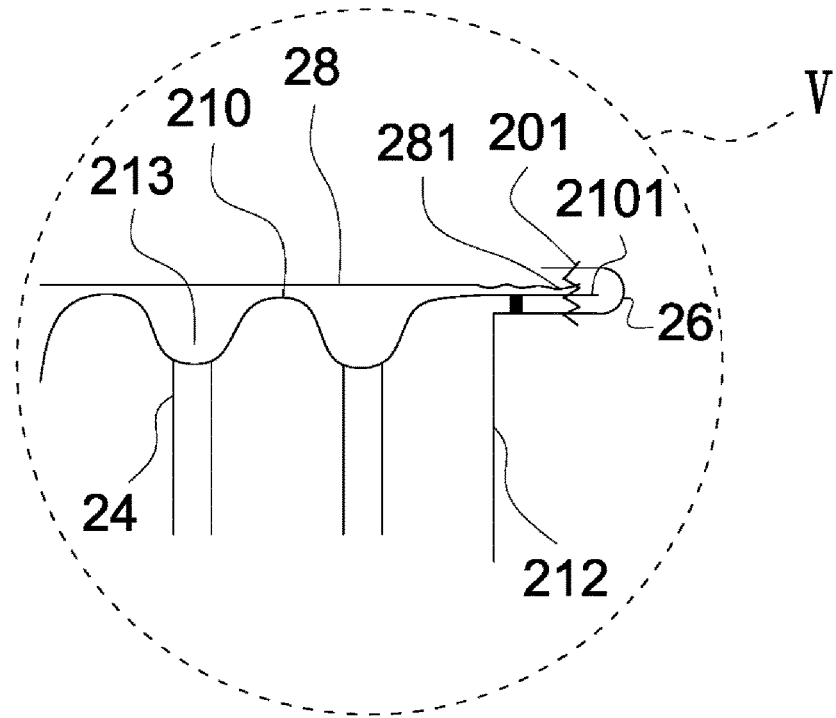
FIG. 5D is a sectional view of a part of an air mattress in accordance with a fourth embodiment of the invention.

FIG. 5D is a sectional view of a part of an air mattress in accordance with a fourth embodiment of the invention, wherein the third wall 212 and the trim sheet 26 are integrally formed as one continuous piece, while the third wall 212 and the trim sheet 26 in the second embodiment are two discrete elements. In the fourth embodiment, the trim sheet 26 wraps around the first edge portion 2101 and the third edge portion 281 and is fixed thereto by sewing.

Figure 5E:
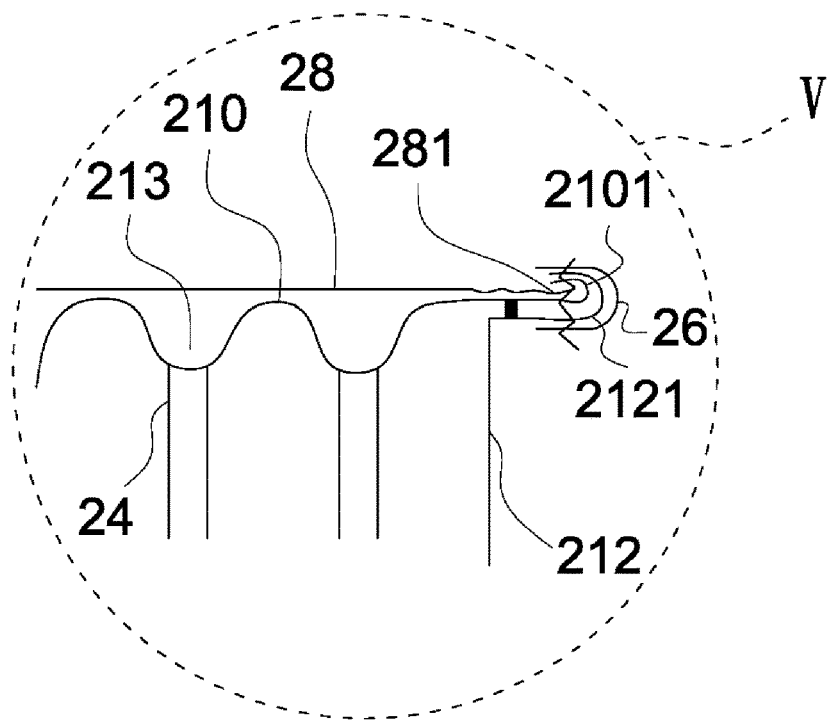
FIG. 5E is a sectional view of a part of an air mattress in accordance with a fifth embodiment of the invention.

FIG. 5E is a sectional view of a part of an air mattress in accordance with a fifth embodiment of the invention, wherein the first edge portion 2101 and the second edge portion 2121 are folded to wrap around the third edge portion 281, and the trim sheet 26 is folded to wrap around the first edge portion 2101, the second edge portion 2121 and the third edge portion 281. In the first embodiment, however, the first edge portion 2101 and the second edge portion 2121 are not folded to wrap around the third edge portion 281. Instead, the first edge portion 2101, the second edge portion 2121 and the third edge portion 281 are directly covered by the trim sheet 26.

Figure 5F:
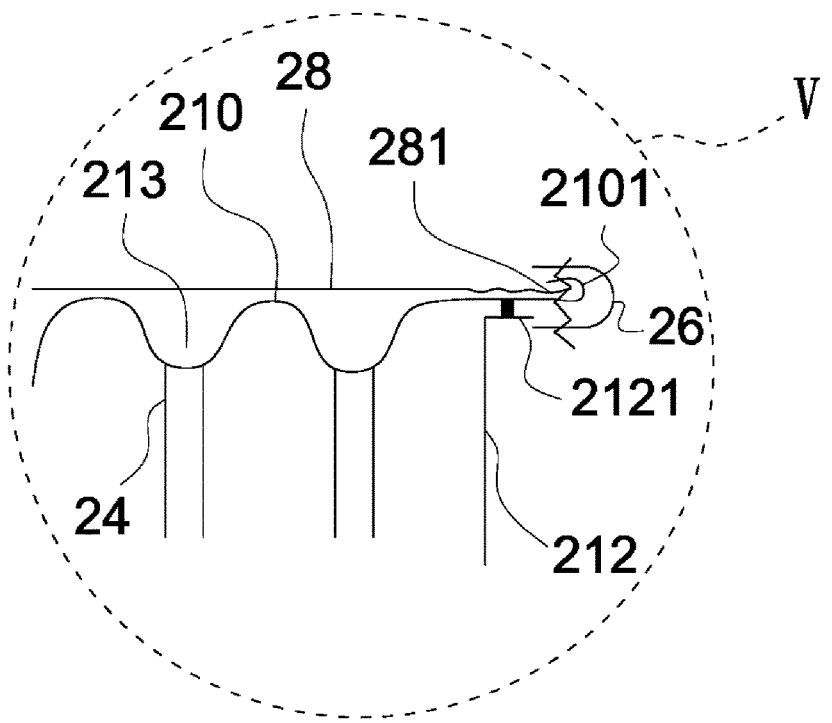
FIG. 5F is a sectional view of a part of an air mattress in accordance with a sixth embodiment of the invention.

FIG. 5F is a sectional view of a part of an air mattress in accordance with a sixth embodiment of the invention. The sixth embodiment differs from the fifth embodiment in that in the sixth embodiment the first edge portion 2101 and the third edge portion 281 are covered by the trim sheet 26 and the second edge portion 2121 is not covered thereby. Further, the second edge portion 2121 is not sewed together with the trim sheet 26, the first edge portion 2101 and the third edge portion 281. However, it is understood that the second edge portion 2121 which is not folded can be modified to be sewed together with the trim sheet 26, the first edge portion 2101 and the third edge portion 281.

Figure 5G:
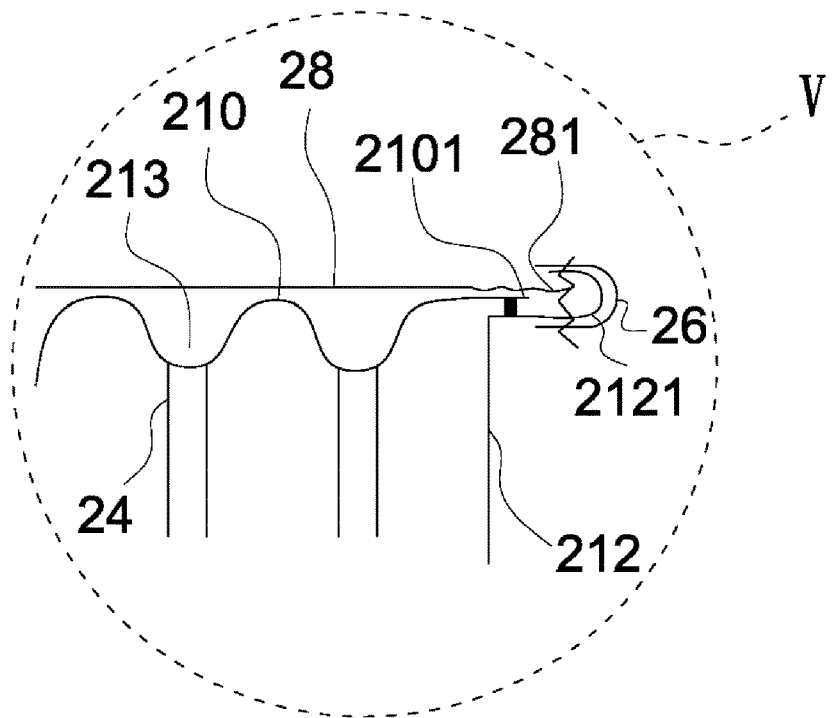
FIG. 5G is a sectional view of a part of an air mattress in accordance with a seventh embodiment of the invention.

FIG. 5G is a sectional view of a part of an air mattress in accordance with a seventh embodiment of the invention. The seventh embodiment differs from the fifth embodiment in that in the seventh embodiment the second edge portion 2121 and the third edge portion 281 are covered by the trim sheet 26 and the first edge portion 2101 is not covered thereby. Further, the first edge portion 2101 is not sewed together with the trim sheet 26, the second edge portion 2121 and the third edge portion 281. However, it is understood that the first edge portion 2101 which is not folded can be modified to be sewed together with the trim sheet 26, the second edge portion 2121 and the third edge portion 281.

Figure 5H:
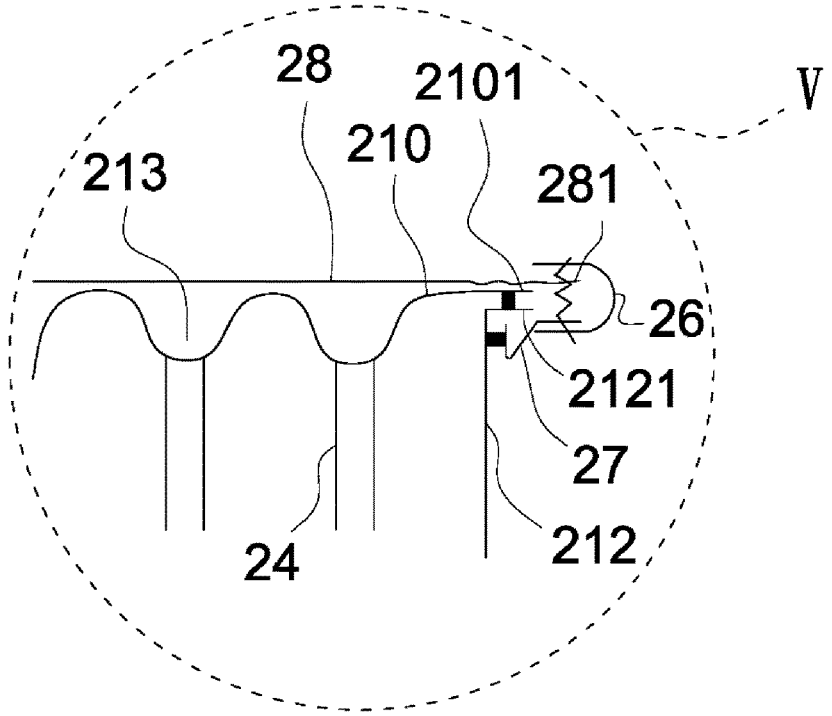
FIG. 5H is a sectional view of a part of an air mattress in accordance with an eighth embodiment of the invention.

FIG. 5H is a sectional view of a part of an air mattress in accordance with an eighth embodiment of the invention, wherein the air mattress further includes an auxiliary sheet 27 and the auxiliary sheet 27 is fused with the third wall 212. The trim sheet 26 does not wrap around the first edge portion 2101 and the second edge portion 2121. Instead, the trim sheet 26 only wraps around the third edge portion 281 and a part of the auxiliary sheet 27, and the trim sheet 26, the third edge portion 281 and the auxiliary sheet 27 are sewed together. It is noted that the first air permeable layer 28 of the first embodiment through the seventh embodiment is directly fixed to the inflatable chamber 21 by sewing. However, the first air permeable layer 28 of the eighth embodiment is indirectly fixed to the inflatable chamber 21 by sewing.

Figure 5I:
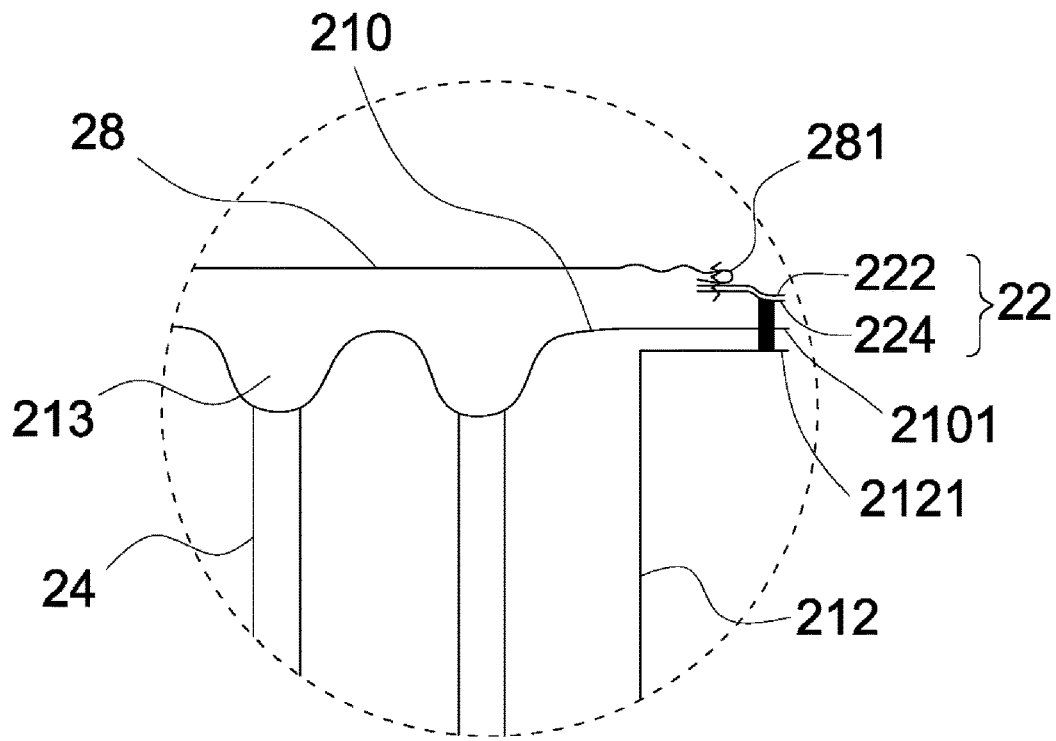
FIG. 5I is a sectional view of a part of an air mattress in accordance with a ninth embodiment of the invention.

FIG. 5I is a sectional view of a part of an air mattress in accordance with a ninth embodiment of the invention, wherein no trim sheet is used in this embodiment. The air mattress further includes an auxiliary structure 22. The auxiliary structure 22 includes two auxiliary sheets 222, 224 wherein the material of the auxiliary sheet 222 may be fabric and the material of the auxiliary sheet 224 may be plastic. The two auxiliary sheets 222, 224 may be bonded together by ways such as gluing or sewing. The third edge portion 281 of the first air permeable layer 28 is folded and fixed with the auxiliary structure 22 by sewing. The auxiliary sheet 224 of the auxiliary structure 22 is fused with the first edge portion 2101 of the first wall 210 and the second edge portion 2121 of the third wall 212. The material of the auxiliary sheet 222 is fabric so that the air mattress can have an improved aesthetic appearance. However, the auxiliary sheet 222 cannot be fused with the first wall 210 and the third wall 212, both of which are made of plastic, because their materials are incompatible with each other. Therefore, an additional auxiliary sheet 224, which is made of plastic and can be fused with the first wall 210 and the third wall 212, is used as a medium for connecting the auxiliary sheet 222 to the first wall 210 and the third wall 212. Further, thanks to the auxiliary sheet 222 (made of fabric), shrinkage of the auxiliary sheet 224 (made of plastic) after fusion can be effectively alleviated and the structural strength of the fusion line of the air mattress can be enhanced. Further, in embodiments of the application, it is contemplated that the auxiliary sheet 224 is fused with only the first wall 210 or only the third wall 212. In other embodiments of the application, it is contemplated that the auxiliary structure 22 is directly fixed with the first wall 210 and/or the third wall 212 by sewing without any fusion.

In all the above embodiments, the first air permeable layer 28 is netting. However, the invention is not limited thereto. It is understood that in embodiments of the application the material of the first air permeable layer 28 may be fabric and/or netting.

Figure 6:
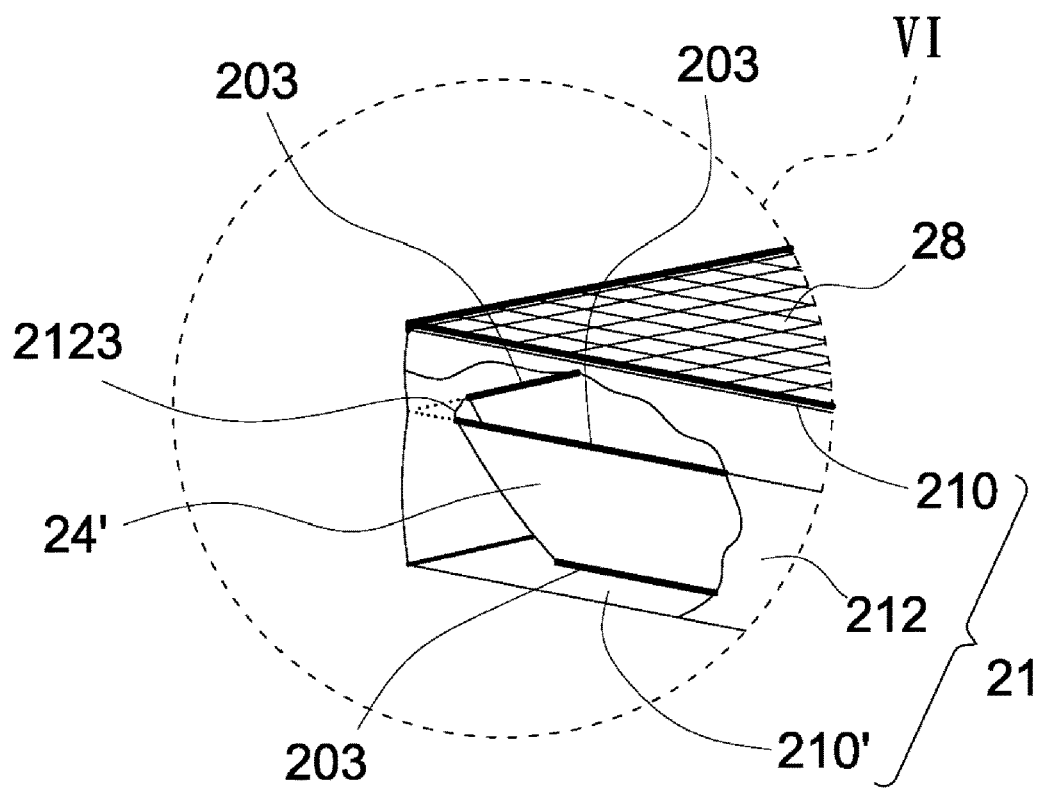
FIG. 6 is a cutaway view of portion VI of the air mattress of FIG. 3.

FIG. 6 is a cutaway view of portion VI of the air mattress of FIG. 3, wherein a part of the third wall 212 is removed to expose the interior of the inflatable chamber 21. As shown, at least one strap 24' is provided in the inflatable chamber 21, with the lower portion fused with the second wall 210' and the upper portion fused with the third wall 212. When the inflatable chamber 21 is inflated, a pulling force is generated by the strap 24' to limit expansion of the third wall 212. It is noted that the strap 24' is slanted and the inflatable chamber 21 is angled (not rounded) at its corners. Under such circumstance, the upper edge of the strap 24' may be wrinkled at the corner of the inflatable chamber 21. To avoid the wrinkles, the upper edge of the strap 24' of the invention is not fused with the inflatable chamber 21 at the corner. In FIG. 6, the thick lines 203 indicate the fusion lines. A portion 2123 at the upper edge of the strap 24' is not fused with the third wall 212. According to experiments, the inflatable chamber 21 suffers from less stress at the corner and therefore is less liable to rupture even without fusion at the corner. In FIG. 6, the second wall 210' is the bottom wall of the inflatable chamber 21. However, that is only for easy description and the invention is not limited thereto. It is understood that the second wall 210' can be the top wall of the inflatable chamber 21. Further, the structure of FIG. 6 can apply to both of the top wall and the bottom wall of the inflatable chamber 21.

Referring to FIGS. 7A, 7B, 8, 9 and 10, in a tenth embodiment, an air mattress 3 includes an outermost fabric layer 33, a resilient layer 37, a first air permeable layer 38, an inflatable chamber 31, an outermost fabric layer 35 and a second air permeable layer 39. The inflatable chamber 31 includes a first wall 310, a second wall 310' and a third wall 312. The first wall 310, the second wall 310' and the third wall 312 are fused with each other to form the inflatable chamber 31. A plurality of straps 34 are provided in the inflatable chamber 31. The straps 34 are fused with the first wall 310, the second wall 310' and the third wall 312. Under the action of the straps 34, the first wall 310 has a plurality of first depressions 313 and the first air permeable layer 38 is disposed on the first wall 310 to cover the first depressions 313 thereby improving the flatness of the air mattress 3. The first air permeable layer 38 may be netting. The resilient layer 37 is disposed between the outermost fabric layer 33 and the first air permeable layer 38. The resilient layer 37 may be, for example, a foam to improve user's comfort. The outermost fabric layer 35 is disposed to surround the third wall 312, both of which may be glued together or not glued together. The outermost fabric layer 33 and the outermost fabric layer 35 may be made of ordinary fabric for providing the air mattress 3 with an improved aesthetic appearance.

Figure 8:
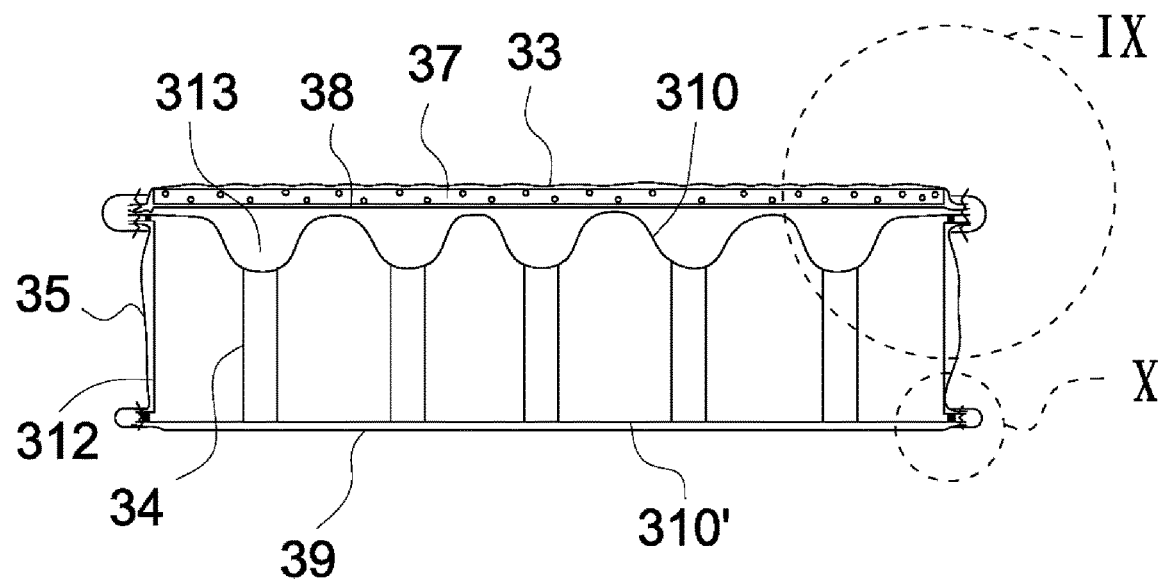
FIG. 8 is a sectional view of an air mattress in accordance with the tenth embodiment of the invention.
Figure 9:
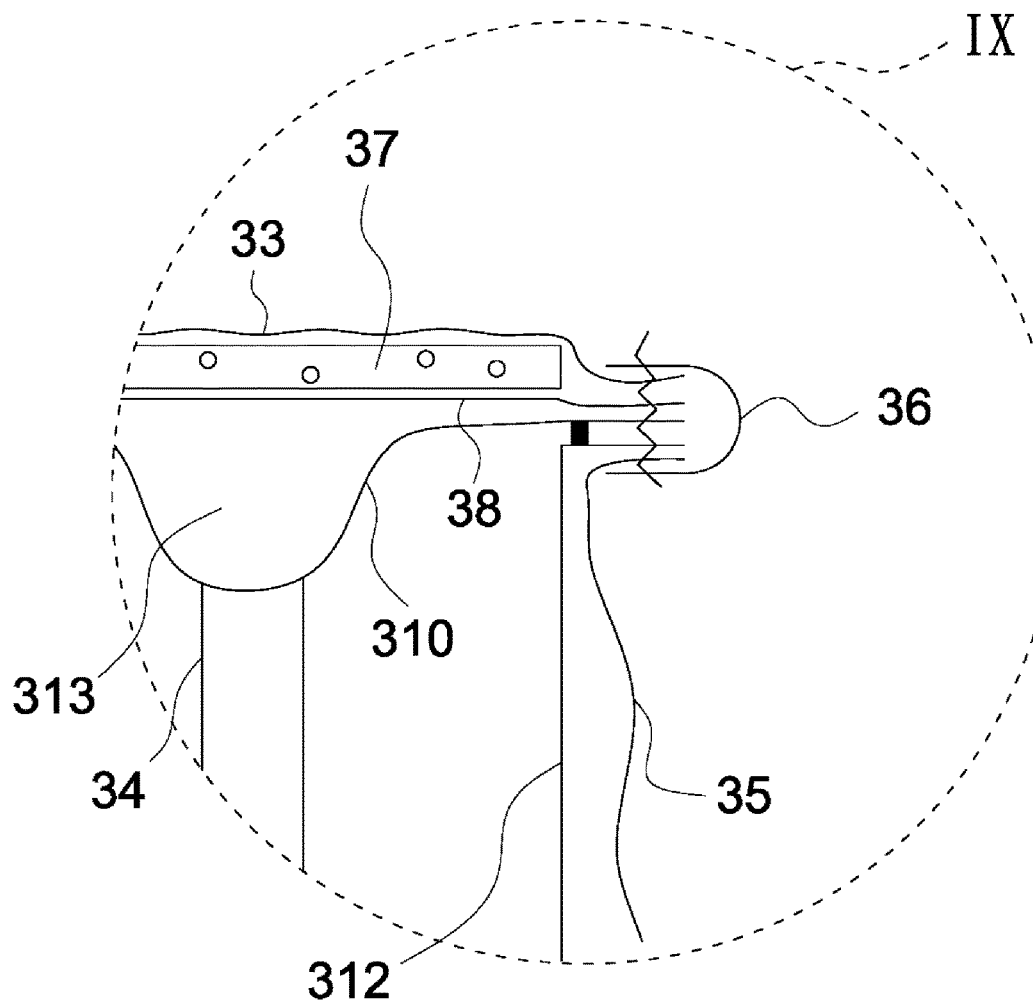
FIG. 9 is an enlarged view of portion IX of the air mattress of FIG. 8.

FIG. 9 is an enlarged view of portion IX of the air mattress of FIG. 8. As shown, the outermost fabric layer 35, the third wall 312, the first wall 310, the first air permeable layer 38 and the outermost fabric layer 33 are partially covered by the trim sheet 36, and all of them are fixed together by sewing.

Figure 10:
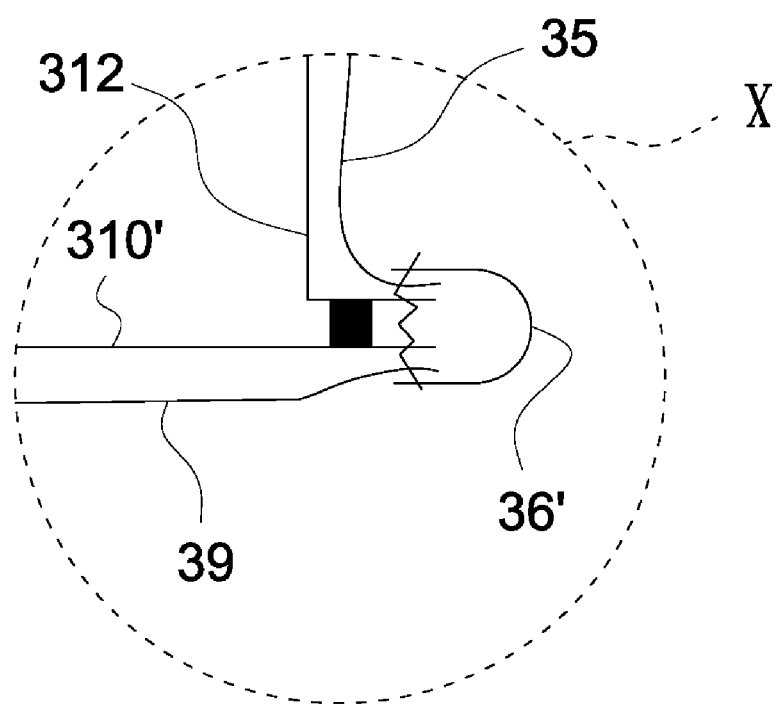
FIG. 10 is an enlarged view of portion X of the air mattress of FIG. 8.

FIG. 10 is an enlarged view of portion X of the air mattress of FIG. 8. As shown, the outermost fabric layer 35, the third wall 312, the second wall 310' and the second air permeable layer 39 are partially covered by another trim sheet 36', and all of them are fixed together by sewing. In this embodiment, the second air permeable layer 39 is netting.

Figure 11:
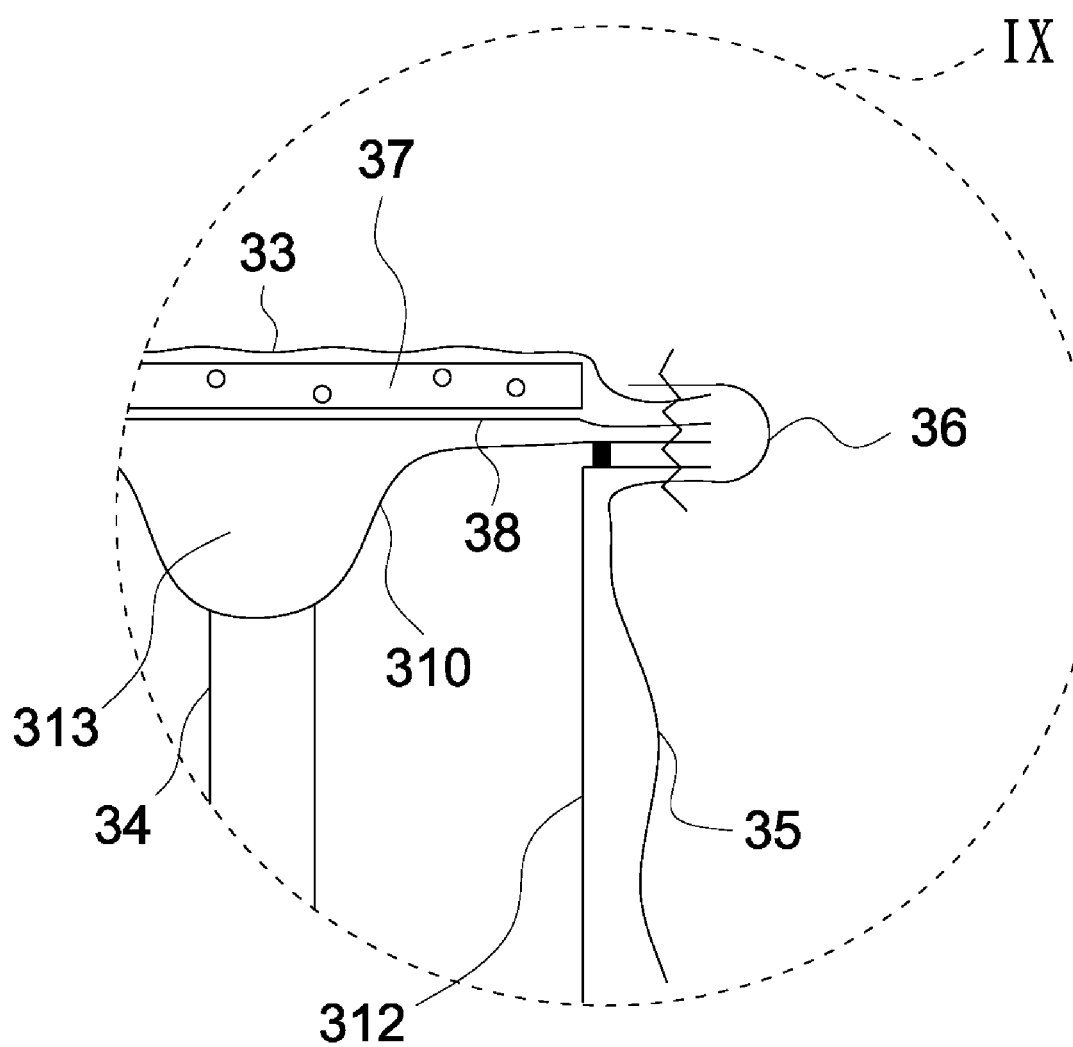
FIG. 11 is a sectional view of a part of an air mattress in accordance with an eleventh embodiment of the invention.
Figure 12:
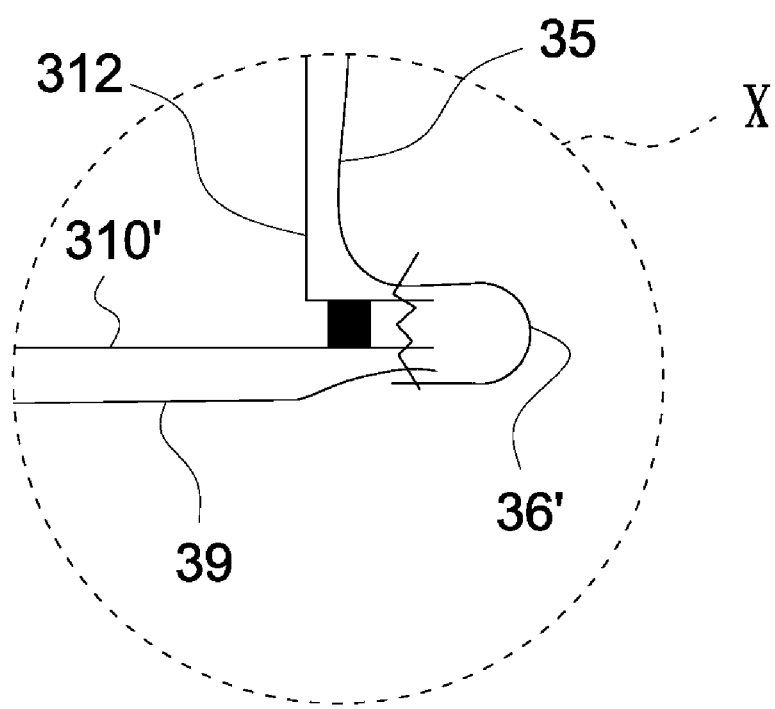
FIG. 12 is a sectional view of another part of an air mattress in accordance with the eleventh embodiment of the invention.

FIGS. 11 and 12 depicts an air mattress in accordance with an eleventh embodiment of the invention, wherein the outermost fabric layer 35 and the trim sheets 36, 36' are integrally formed as one continuous piece, while the outermost fabric layer 35 and the trim sheets 36, 36' in the tenth embodiment are discrete elements. In the eleventh embodiment, the third wall 312, the first wall 310, the first air permeable layer 38 and the outermost fabric layer 33 (FIG. 11) are partially covered by the trim sheet 36 and all of them are fixed together by sewing. Similarly, the third wall 312, the second wall 310' and the second air permeable layer 39 (FIG. 12) are partially covered by another trim sheet 36' and all of them are fixed together by sewing. Other structure and arrangements of this embodiment are identical to those of the tenth embodiment and therefore the descriptions thereof are omitted.

The second air permeable layer 39 of the tenth embodiment is netting. In a twelfth embodiment, however, the second air permeable layer is an outermost fabric layer. Alternatively, the second air permeable layer includes an outermost fabric layer and netting. Other structure and arrangements of the twelfth embodiment are identical to those of the tenth embodiment and therefore the descriptions thereof are omitted.

Figure 13:
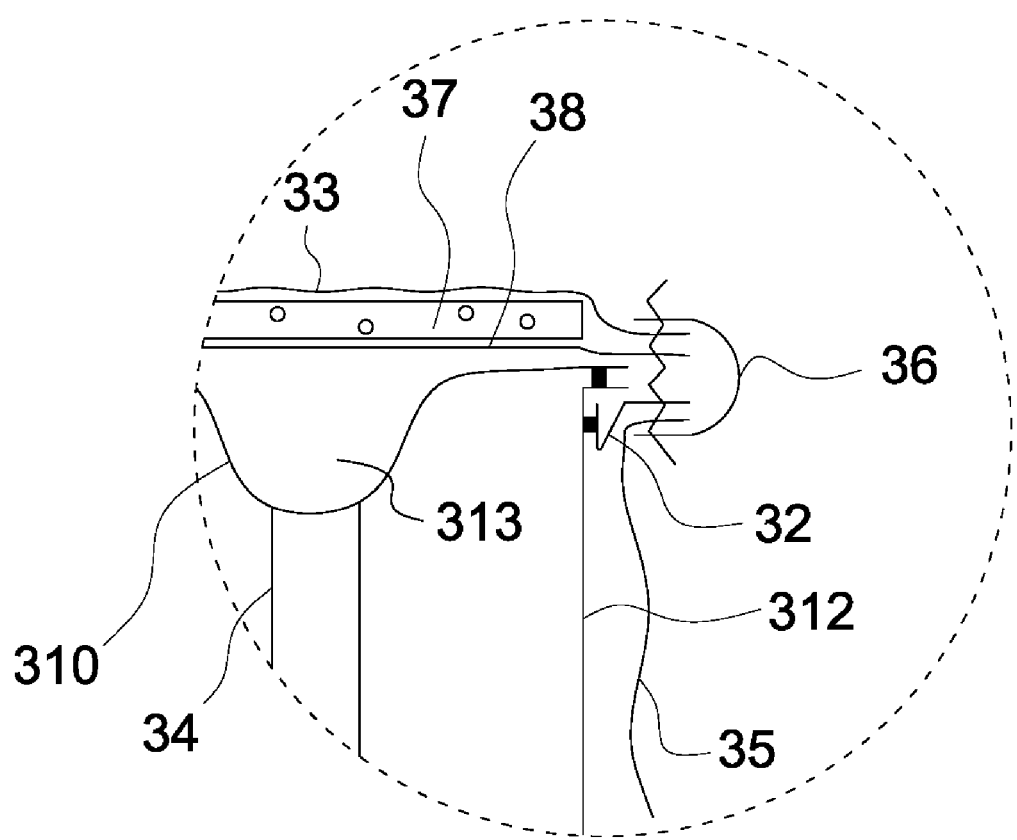
FIG. 13 is a sectional view of a part of an air mattress in accordance with a thirteenth embodiment of the invention.

FIG. 13 is a sectional view of a part of an air mattress in accordance with a thirteenth embodiment of the invention. The thirteenth embodiment differs from the tenth embodiment in that the air mattress 3 of the thirteenth embodiment further includes an auxiliary sheet 32 fused with the third wall 312. The trim sheet 36 does not wrap around the third wall 312 and the first wall 310 but partially wraps around the outermost fabric layer 35, the auxiliary sheet 32, the first air permeable layer 38 and the outermost fabric layer 33. Further, the trim sheet 36, the outermost fabric layer 35, the auxiliary sheet 32, the first air permeable layer 38 and the outermost fabric layer 33 are fixed together by sewing.

Figure 14:
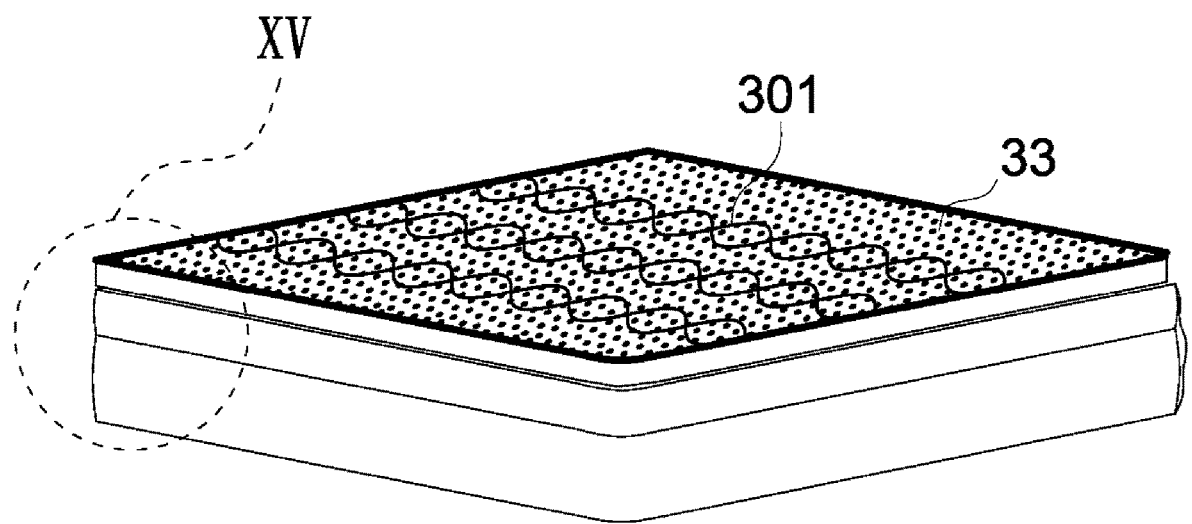
FIG. 14 depicts a first air permeable layer, a resilient layer and a first outermost fabric layer fixed together by sewing in accordance with the invention.

In the tenth embodiment through the thirteenth embodiment, the first air permeable layer 38, the resilient layer 37 and the outermost fabric layer 33 can be further fixed together by sewing as shown in FIG. 14, in which reference numeral 301 indicates the sewing seam. Such arrangement can prevent sliding of the first air permeable layer 38, the resilient layer 37 and the outermost fabric layer 33 with respect to each other when the air mattress is in use.

Figure 7A:
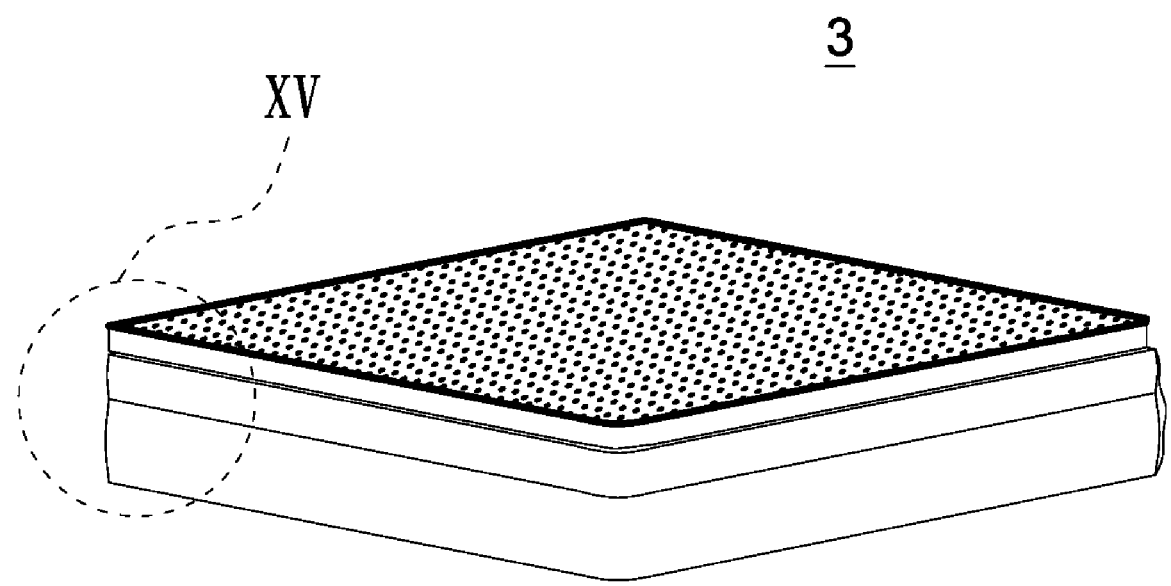
FIG. 7A is a perspective view of an air mattress in accordance with a tenth embodiment of the invention.
Figure 7B:
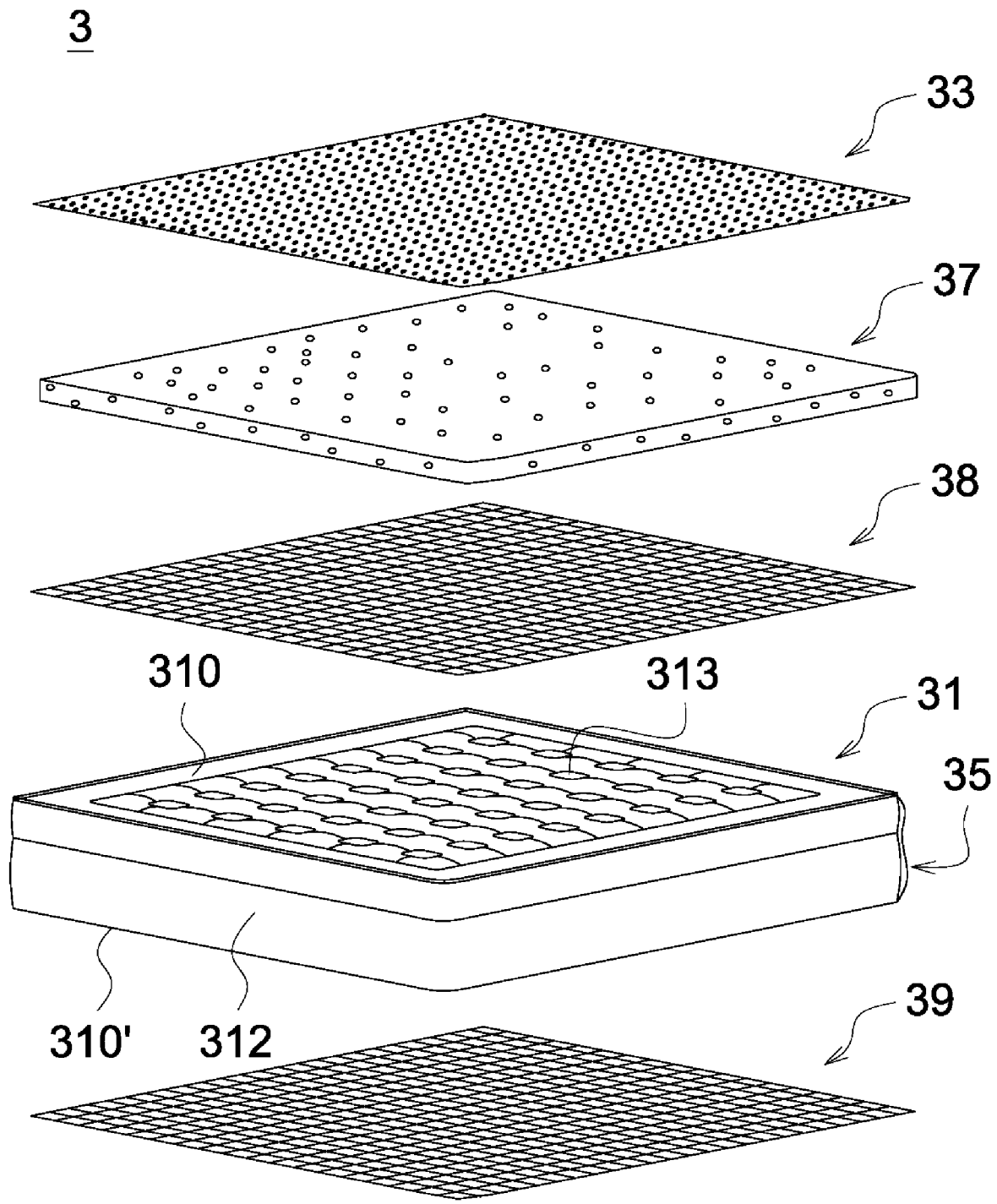
FIG. 7B is an exploded view of an air mattress in accordance with the tenth embodiment of the invention.
Figure 15:
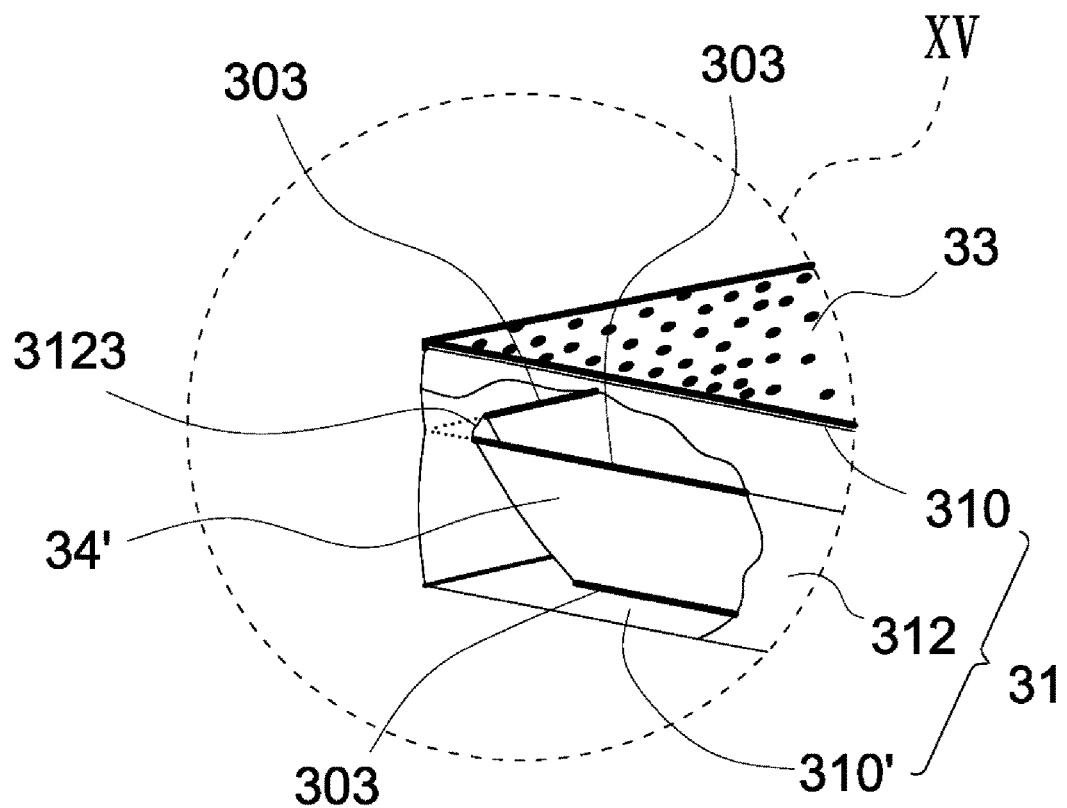
FIG. 15 is a cutaway view showing portion XV of the air mattress of FIG. 7A or FIG. 14.

FIG. 15 is a cutaway view showing portion XV of the air mattress of FIG. 7A or FIG. 14, wherein a part of the third wall 312 is removed to expose the interior of the inflatable chamber 31. As shown, in the inflatable chamber 31, at least one of strap 34' is fused with the second wall 310' and the third wall 312 to control the expansion of the third wall 312. It is noted that the strap 34' is slanted and the inflatable chamber 31 is angled (not rounded) at its corners. Under such circumstance, the upper edge of the strap 34' may be wrinkled at the corner of the inflatable chamber 31. To avoid the wrinkles, the upper edge of the strap 34' of the invention is not fused with the inflatable chamber 31 at the corner. In FIG. 15, the thick lines 303 indicate the fusion lines. A portion 3123 at the upper edge of the strap 34' is not fused with the third wall 312. According to experiments, the inflatable chamber 31 suffers from less stress at the corner and therefore is less liable to rupture even without fusion at the corner. In FIG. 15, the second wall 310' is the bottom wall of the inflatable chamber 31. However, it is understood that the second wall 310' can be the top wall of the inflatable chamber 21. Further, the structure of FIG. 15 can be applied to both of the top wall and the bottom wall of the inflatable chamber 31.

In the above embodiments, a part or all of fusion can be changed to gluing. For example, the first wall 210, 310 and the third wall 212, 312 can be glued together instead of fixed together by fusion.

Figure 16:
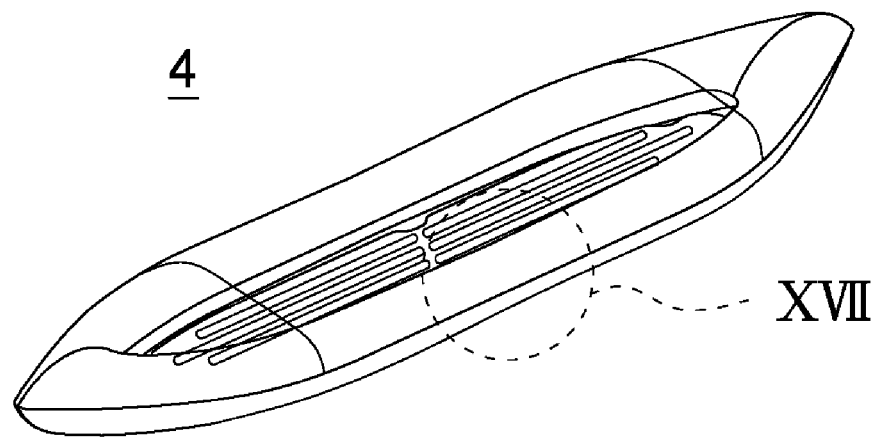
FIG. 16 depicts an inflatable boat in accordance with a fourteenth embodiment of the invention.
Figure 17:
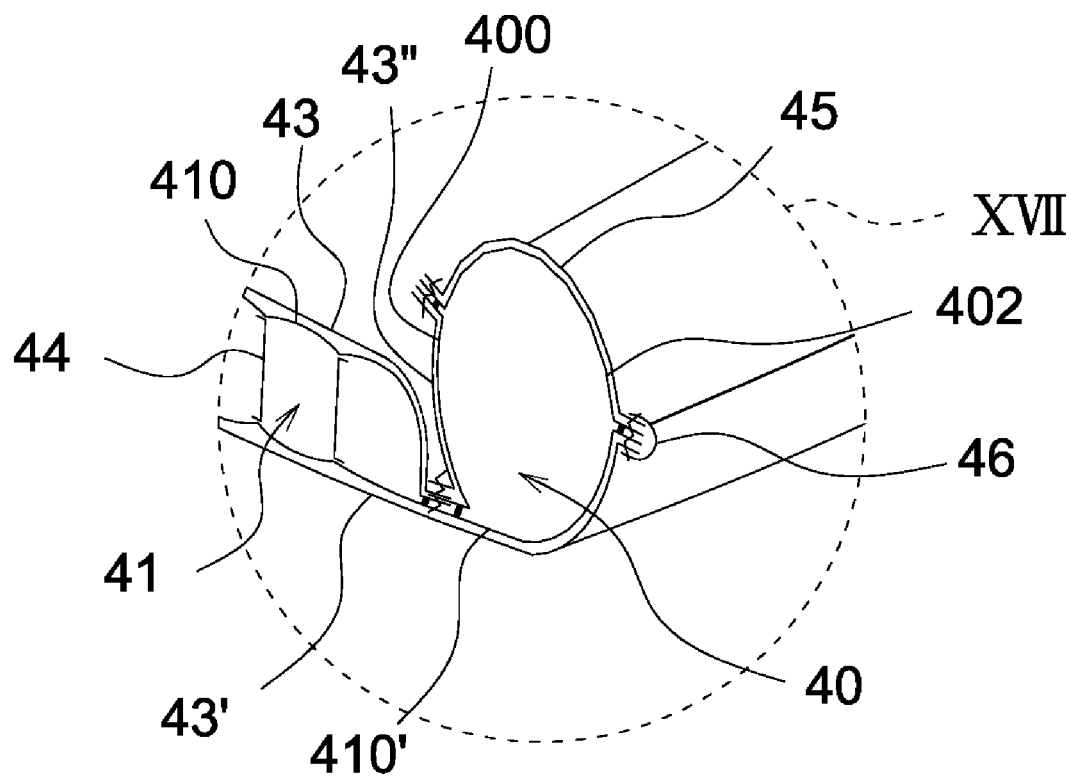
FIG. 17 is a sectional view of a part of the inflatable boat of FIG. 16.

It is understood that various inflatable products such as an inflatable sofa, an inflatable chair, an inflatable boat, and an inflatable swimming pool can apply the techniques of the invention. Referring to FIGS. 16 and 17, FIG. 16 depicts an inflatable boat in accordance with a fourteenth embodiment of the invention, and FIG. 17 is a sectional view of a part of the inflatable boat of FIG. 16. As shown, the inflatable boat 4 of this embodiment includes a plurality of inflatable chambers 40, 41 connected by sewing and fusion. In detail, the inflatable chamber 41 includes a first wall 410 and a second wall 410' connected with their edge portions fused together. A plurality of straps 44 are provided in the inflatable chamber 41 and are connected to the first wall 410 and the second wall 410' by fusion. When the inflatable chamber 41 is inflated to expand, the stretch of the first wall 410 and the second wall 410' is limited by the straps 44, thereby controlling expansion of the inflatable chamber 41 to a desired shape. An outermost fabric layer 43 is provided to cover the first wall 410 of the inflatable chamber 41. The inflatable chamber 40 includes a first wall 400, a third wall 402 and the above-mentioned second wall 410'. It is noted that the inflatable chambers 40, 41 have the second wall 410' in common. The first wall 400, the third wall 402 and the second wall 410' are connected with their edge portions fused together. As shown in FIG. 17, an outermost fabric layer 43 is disposed to cover the first wall 410 of the inflatable chamber 41 while an outermost fabric layer 43" is disposed to cover the first wall 400 of the inflatable chamber 40. The edge portions of the outermost fabric layers 43", 43 and the first walls 400, 410 are sewed together. Further, an outermost fabric layer 45 is disposed to cover the third wall 402. The edge portions of the outermost fabric layer 45, the third wall 402, the first wall 400 and the outermost fabric layer 43" are sewed together. Further, an outermost fabric layer 43' is disposed to cover the second wall 410'. The edge portions of the outermost fabric layer 45, the third wall 402, the second wall 410' and the outermost fabric layer 43' are covered by a trim sheet 46 and fixed together by sewing.

In the above embodiments, the location of sewing is away from that of fusion. However, the invention is not limited thereto. In some examples, the sewing is made along (to coincide with) the fusion line to connect different elements. It is noted that the holes generated by sewing will not cause any air leakage of the inflatable product because the sewing is made on the fusion line.

Figure 18:
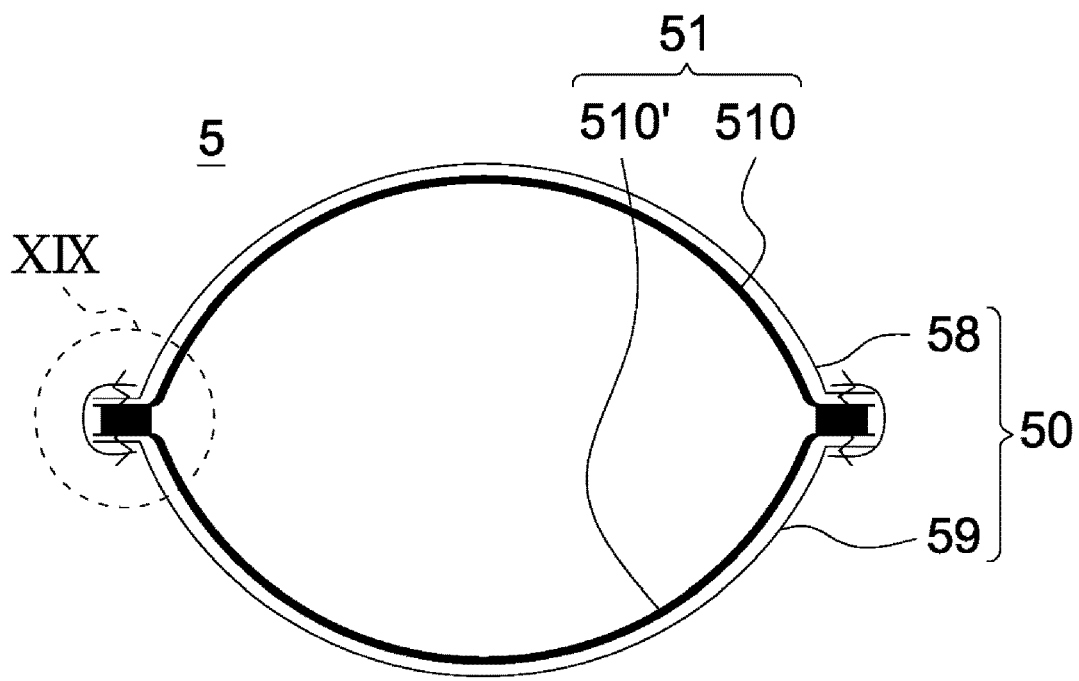
FIG. 18 is a sectional view of an inflatable product in accordance with a fifteenth embodiment of the invention.
Figure 19:
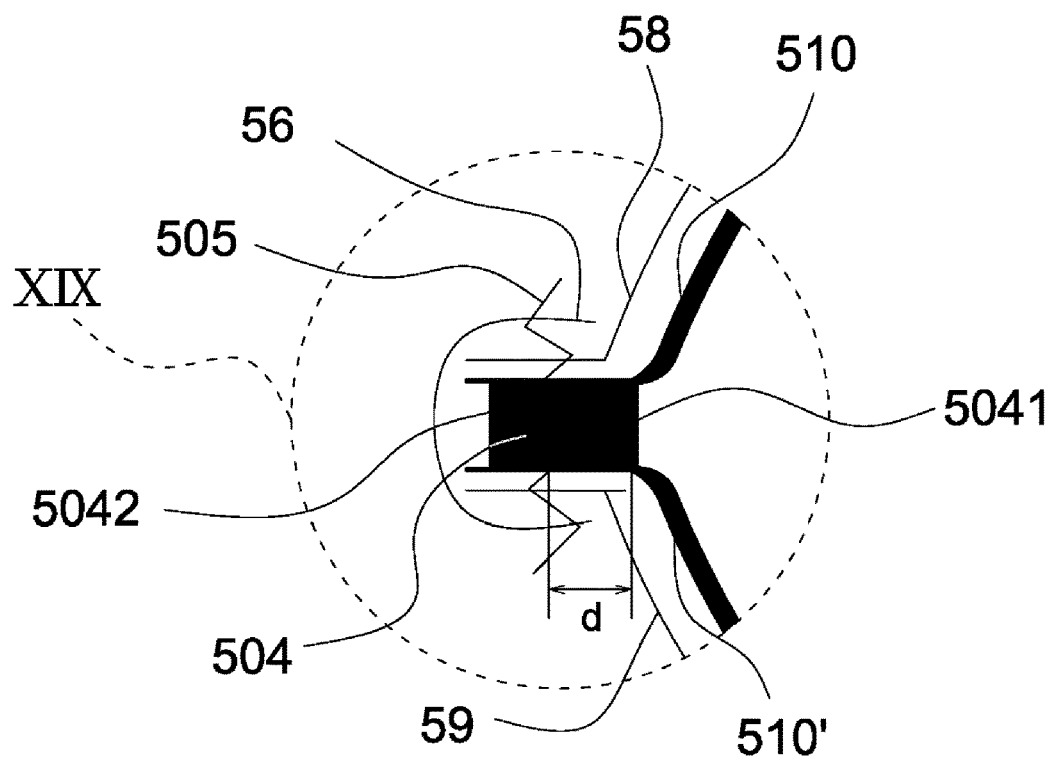
FIG. 19 is an enlarged view of portion XIX of the inflatable product of FIG. 18.

Referring to FIGS. 18 and 19, FIG. 18 is a sectional view of an inflatable product in accordance with a fifteenth embodiment of the invention, and FIG. 19 is an enlarged view of portion XIX of the inflatable product of FIG. 18. As shown, the inflatable product 5 includes a first wall 510 and a second wall 510' fused together at their edge portions to form an inflatable chamber 51. A first air permeable layer 58 is disposed to cover the first wall 510 and a second air permeable layer 59 is disposed to cover the second wall 510'. The edge portions of the first air permeable layer 58, the first wall 510, the second wall 510' and the second air permeable layer 59 are covered by a trim sheet 56, and all of them (including the trim sheet 56) are fixed together by sewing. In this embodiment, the first wall 510 and the second wall 510' are made of plastic material such as Polyvinyl Chloride (PVC). The first air permeable layer 58, the second air permeable layer 59 and the trim sheet 56 are netting or fabric sheets. In FIG. 19, reference numeral 504 indicates the fusion line and reference numeral 505 indicates the sewing threads. It is noted that the sewing is made on the fusion line. The fusion line 504 has an outer edge 5042 and an inner edge 5041 closer to an interior of the inflatable chamber 51 than the outer edge 5042. In this embodiment, the sewing threads 505 are at least 2.5 mm away from the inner edge 5041 of the fusion line 504. That is, d≥2.5 mm where d is the distance between the sewing threads 505 and the inner edge 5041 of the fusion line 504. Such an arrangement guarantees duration of the connection.

In the fifteenth embodiment, the inflatable chamber 51 (formed by the first wall 510 and the second wall 510') is disposed in an envelope 50 (formed by the first air permeable layer 58 and the second air permeable layer 59) and fixed thereto by sewing on the fusion line. Such an arrangement has many merits, especially when the inflatable product is complicated in structure and shape. For example, the inflatable chamber 51, before inflated, can have every portions set well in the envelope 50. During inflation, therefore, expansion of the inflatable chamber 51 will be under control that can facilitate expansion of the inflatable chamber 51 to a predetermined shape and can effectively avoid rupture of the inflatable chamber 51. Specifically, the described arrangement can avoid that during inflation the plastic material continues to be stretched, becomes thinner and thinner, and ends up being ruptured (generally, the rupture of the plastic material occurs next to the fusion lines arising from an over-stretch of plastic material). For another example, the inflatable chamber 51, after deflation, can be readily folded in order to occupy less space.

Figure 20:
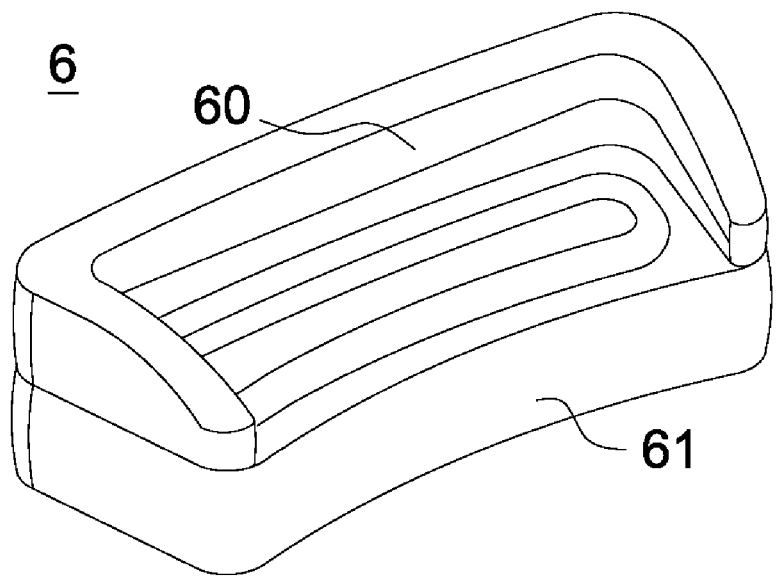
FIG. 20 depicts an inflatable sofa in accordance with a sixteenth embodiment of the invention.
Figure 21:
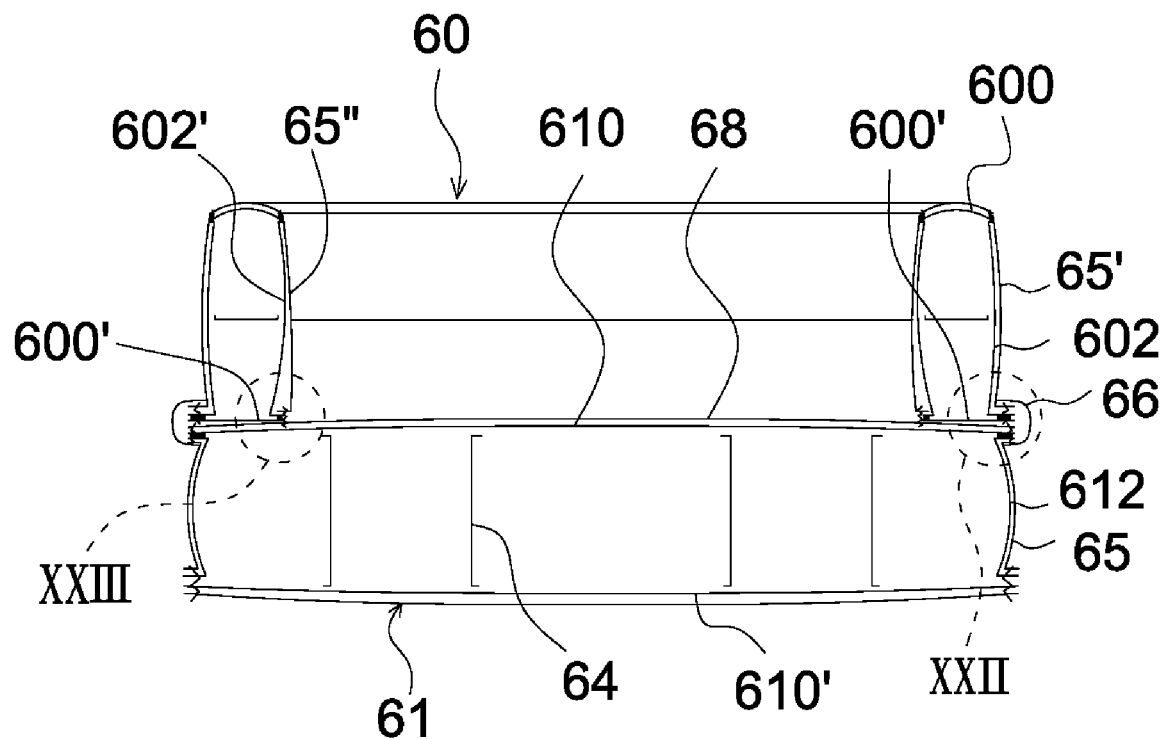
FIG. 21 is a sectional view of the inflatable sofa of FIG. 20.
Figure 22:
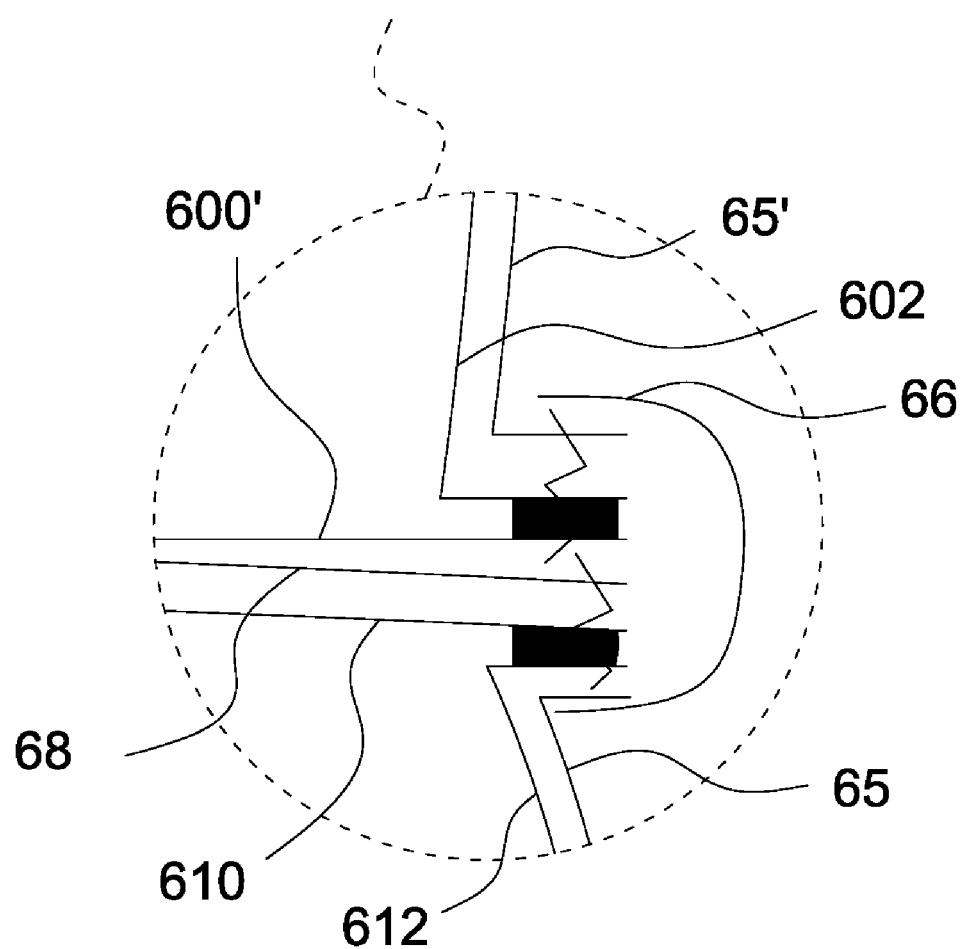
FIG. 22 is an enlarged view of portion XXII of the inflatable sofa of FIG. 21.

Referring to FIGS. 20-22, FIG. 20 depicts an inflatable sofa in accordance with a sixteenth embodiment of the invention, FIG. 21 is a sectional view of the inflatable sofa of FIG. 20, and FIG. 22 is an enlarged view of portion XXII of the inflatable sofa of FIG. 21. The inflatable sofa 6 includes an inflatable chamber (backrest and armrest) 60 and an inflatable chamber (seat) 61. The inflatable chamber 60 includes a first wall 600, a second wall 600', a third wall 602 and an outermost fabric layer 65' wherein the third wall 602 and the outermost fabric layer 65' are disposed at the outer circumference of the inflatable chamber (backrest and armrest) 60. The first wall 600, the third wall 602 and the second wall 600' are fused together at their edge portions. The outermost fabric layer 65', the third wall 602 and the second wall 600' are sewed together at their edge portions where the third wall 602 and the second wall 600' are connected by fusion. The inflatable chamber 61 includes a first wall 610, a second wall 610' and a third wall 612 which are connected at their edge portions by sewing and/or fusion. A plurality of straps 64 are provided in the inflatable chamber 61 and connected to the first wall 610 and the second wall 610'. A first air permeable layer 68 is disposed to cover the first wall 610. An outermost fabric layer 65 is disposed to cover the third wall 612. The first air permeable layer 68, the first wall 610, the third wall 612 and the outermost fabric layer 65 are sewed together at their edge portions where the first wall 610 and the third wall 612 are connected by fusion. It is noted that the edge portions of the outermost fabric layer 65', the third wall 602 and the second wall 600' sewed together and the edge portions of the first permeable layer 68, the first wall 610, the third wall 612 and the outermost fabric layer 65 sewed together are covered by a trim sheet 66 and fixed together.

Figure 23:
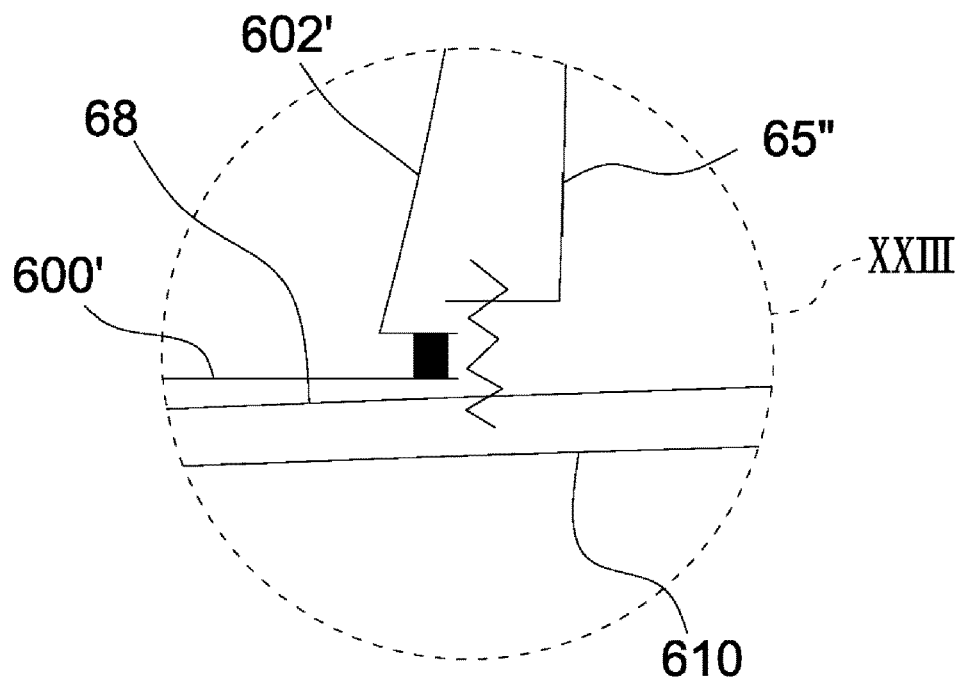
FIG. 23 is an enlarged view of portion XXIII of the inflatable sofa of FIG. 21.

Referring to FIG. 23, FIG. 23 is an enlarged view of portion XXIII of the inflatable sofa of FIG. 21. The inflatable chamber (backrest and armrest) 60 further includes a third wall 602' which is covered with an outermost fabric layer 65". The third wall 602' and the outermost fabric layer 65" are disposed at the inner circumference of the inflatable chamber 60. The third wall 602' and the second wall 600' are fused together at their edge portions, while the outermost fabric layer 65" and the first air permeable layer 68 are sewed together. It is noted that the location of sewing is away from that of fusion. Specifically, the armrest is directly connected to the seat by sewing without any fusion at the inner circumference and the bottom of the armrest. Such a connecting way is easy and fast.

Figure 24:
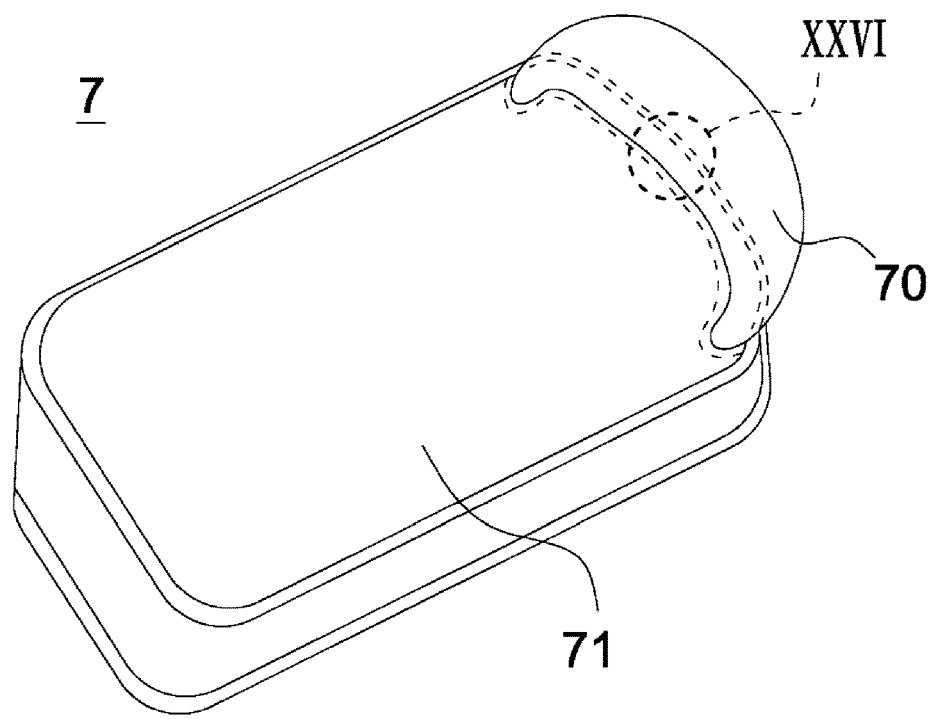
FIG. 24 is a perspective view of an air mattress with an inflatable headboard in accordance with a seventeenth embodiment of the invention.
Figure 25:
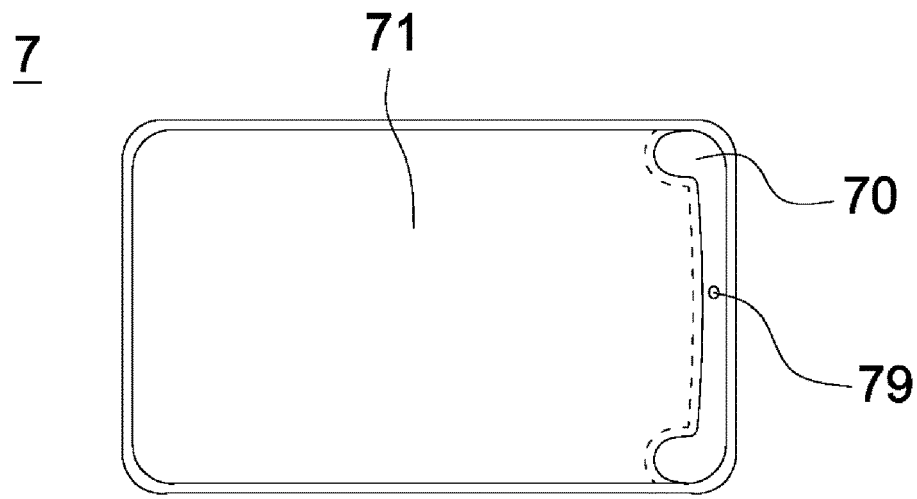
FIG. 25 is a top view of the air mattress of FIG. 24.
Figure 26:
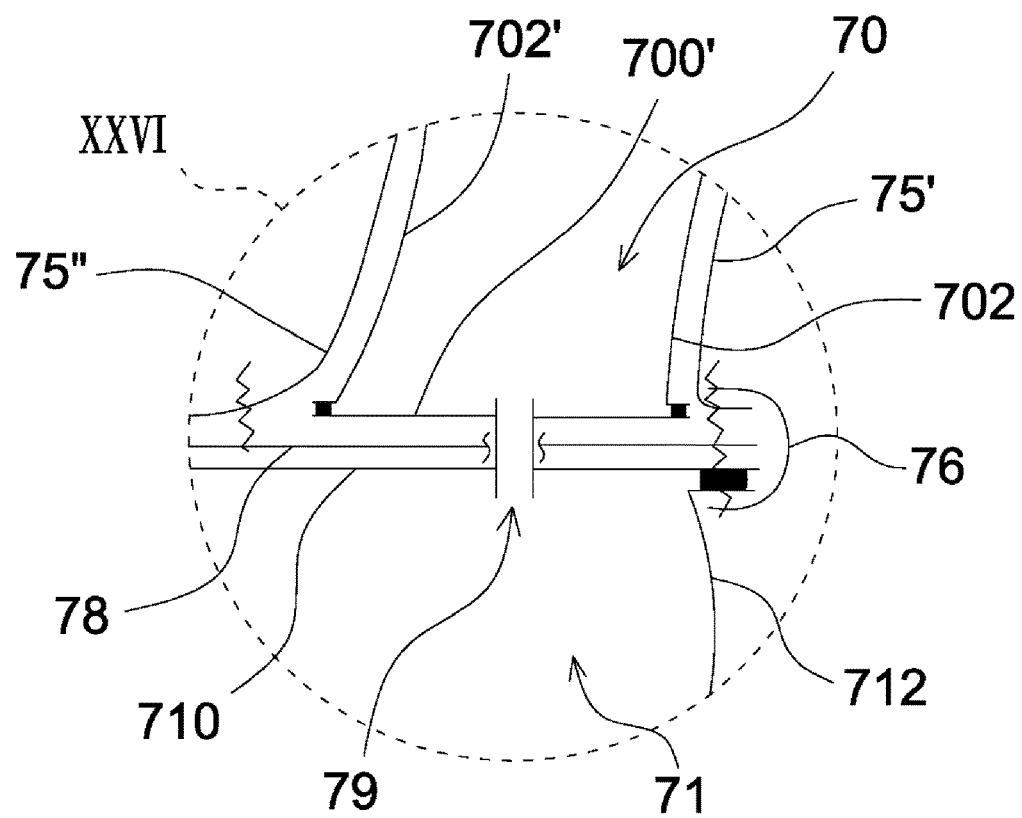
FIG. 26 is a sectional view of portion XXVI of the air mattress of FIG. 24.

Referring to FIGS. 24-26, an air bed with an inflatable headboard in accordance with a seventeenth embodiment of the invention includes an inflatable chamber (mattress) 71, an inflatable chamber (headboard) 70 and a passage 79 connecting the two inflatable chambers 70, 71. The inflatable chamber 71 includes a first wall 710 and a third wall 712 fused together at their edge portions. A first air permeable layer 78 is disposed to cover the first wall 710. The inflatable chamber 70 includes a second wall 700' and third walls 702, 702' fused together. Outermost fabric layers 75', 75" are respectively disposed to cover the third walls 702, 702'. The edge portions of the outermost fabric layer 75', the first air permeable layer 78, the first wall 710 and the third wall 712 are covered by a trim sheet 76, all of which are sewed together. It is noted that the sewing is made on the fusion line of the first wall 710 and the third wall 712. Further, the outermost fabric layer 75" and the first air permeable layer 78 are sewed together without any fusion therebetween. That is, the bottom of the headboard is directly connected to the mattress by sewing the outermost fabric layer 75" and the first air permeable layer 78 together without fusion therebetween. Such a connecting way is easy and fast.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An inflatable product, comprising:
   an inflatable chamber;
   a supplemental layer fixed to the inflatable chamber by sewing;
   a strap;
   a trim sheet;
   wherein the inflatable chamber comprises a first wall, a second wall and a third wall, and the third wall is connected between the first wall and the second wall;
   wherein the strap is disposed in the inflatable chamber and connected to the first wall and the second wall;
   wherein the first wall is pulled by the strap to form at least one first depression when the inflatable chamber is inflated;
   wherein the supplemental layer is placed to cover the first depression;
   wherein the first wall comprises a first edge portion, the third wall comprises a second edge portion, and the supplemental layer comprises a third edge portion;
   wherein the trim sheet and the third edge portion are fixed together by sewing.

2. The inflatable product as claimed in claim 1, wherein the first edge portion and the second edge portion wrap around the third edge portion; the trim sheet is wrapped around the first edge portion, the second edge portion and the third edge portion; and the trim sheet, the first edge portion, the second edge portion and the third edge portion are fixed together by sewing.

3. The inflatable product as claimed in claim 1, further comprising an auxiliary sheet wherein the auxiliary sheet is fused with the third wall; the trim sheet is wrapped around the third edge portion and to partially wrap around the auxiliary sheet; and the trim sheet, the third edge portion and the auxiliary sheet are fixed together by sewing.

4. The inflatable product as claimed in claim 1, wherein the trim sheet is wrapped around the first edge portion and the third edge portion; and the trim sheet, the first edge portion and the third edge portion are fixed together by sewing.

5. The inflatable product as claimed in claim 4, wherein the trim sheet and the third wall are integrally formed as one continuous piece.

6. The inflatable product as claimed in claim 1, wherein the trim sheet is wrapped around the second edge portion and the third edge portion; and the trim sheet, the second edge portion and the third edge portion are fixed together by sewing.

7. The inflatable product as claimed in claim 1, wherein the trim sheet is wrapped around the first edge portion, the second edge portion and the third edge portion; and the trim sheet, the first edge portion, the second edge portion and the third edge portion are fixed together by sewing.

8. The inflatable product as claimed in claim 1, wherein the first edge portion is wrapped around the third edge portion; the trim sheet is wrapped around the first edge portion and the third edge portion; and the trim sheet, the first edge portion and the third edge portion are fixed together by sewing.

9. The inflatable product as claimed in claim 8, wherein the second edge portion is also fixed together with the trim sheet, the first edge portion and the third edge portion by sewing.

10. The inflatable product as claimed in claim 1, wherein the second edge portion is wrapped around the third edge portion; the trim sheet is wrapped around the second edge portion and the third edge portion; and the trim sheet, the second edge portion and the third edge portion are fixed together by sewing.

11. The inflatable product as claimed in claim 10, wherein the first edge portion is also fixed together with the trim sheet, the second edge portion and the third edge portion by sewing.

12. An inflatable product, comprising:
an inflatable chamber;
a supplemental layer fixed to the inflatable chamber by sewing;
a strap;
an auxiliary structure;
wherein the inflatable chamber comprises a first wall, a second wall and a third wall, and the third wall is connected between the first wall and the second wall;
wherein the strap is disposed in the inflatable chamber and connected to the first wall and the second wall;
wherein the first wall is pulled by the strap to form at least one first depression when the inflatable chamber is inflated;
wherein the supplemental layer is placed to cover the first depression;
wherein the first wall comprises a first edge portion, the third wall comprises a second edge portion, and the supplemental layer comprises a third edge portion;
wherein the third edge portion is folded and fixed with the auxiliary structure by sewing.

13. The inflatable product as claimed in claim 12, further comprising an auxiliary structure wherein the auxiliary structure comprises at least one auxiliary sheet which is fixed with the third edge portion of the supplemental layer by sewing.

14. The inflatable product as claimed in claim 12, wherein the auxiliary structure is fused with the first edge portion and/or the second edge portion.

15. The inflatable product as claimed in claim 14, wherein the auxiliary structure comprises two auxiliary sheets one of which is fused with the first edge portion and/or the second edge portion.

16. The inflatable product as claimed in claim 15, wherein the auxiliary sheets are glued together.

17. The inflatable product as claimed in claim 14, wherein the auxiliary structure comprises an auxiliary sheet which is fused with the first edge portion and/or the second edge portion.

18. The inflatable product as claimed in claim 12, further comprising an auxiliary structure wherein the auxiliary structure is fixed with the first edge portion and/or the second edge portion by sewing.

19. The inflatable product as claimed in claim 18, wherein the auxiliary structure comprises two auxiliary sheets which are fixed with the first edge portion and/or the second edge portion by sewing.

20. The inflatable product as claimed in claim 19, wherein the auxiliary sheets are glued together.

21. An inflatable product comprising:
an inflatable chamber;
a supplemental layer fixed to the inflatable chamber by sewing;
a strap;
wherein the inflatable chamber comprises a first wall, a second wall and a third wall, and the third wall is connected between the first wall and the second wall;
wherein the strap is disposed in the inflatable chamber and connected to the first wall and the second wall;
wherein the first wall is pulled by the strap to form at least one first depression when the inflatable chamber is inflated;
wherein the supplemental layer is placed to cover the first depression;
wherein the inflatable product further comprises another strap disposed in the inflatable chamber, which connects to the first wall and the third wall and comprises an edge wherein the edge is not directly connected to the third wall at a corner of the inflatable chamber.

22. An inflatable product comprising:
an inflatable chamber;
a supplemental layer fixed to the inflatable chamber by sewing;
a strap;
wherein the inflatable chamber comprises a first wall, a second wall and a third wall, and the third wall is connected between the first wall and the second wall;
wherein the strap is disposed in the inflatable chamber and connected to the first wall and the second wall;
wherein the first wall is pulled by the strap to form at least one first depression when the inflatable chamber is inflated;
wherein the supplemental layer is placed to cover the first depression;
wherein the inflatable product further comprises another strap disposed in the inflatable chamber, which connects to the second wall and the third wall and comprises an edge wherein the edge is not directly connected to the third wall at a corner of the inflatable chamber.

23. An inflatable product, comprising:
an inflatable chamber;
a supplemental layer fixed to the inflatable chamber by sewing;
a strap;
a trim sheet;
a first outermost layer;
wherein the inflatable chamber comprises a first wall, a second wall and a third wall, and the third wall is connected between the first wall and the second wall;
wherein the strap is disposed in the inflatable chamber and connected to the first wall and the second wall;
wherein the first wall is pulled by the strap to form at least one first depression when the inflatable chamber is inflated;
wherein the supplemental layer is placed to cover the first depression;
wherein the trim sheet, the supplemental layer and the first outermost layer are fixed together by sewing.

24. The inflatable product as claimed in claim 23, further comprising a resilient layer wherein the resilient layer is disposed between the first outermost layer and the inflatable chamber; the trim sheet partially wraps around the third wall, the supplemental layer and the first outermost layer; and the trim sheet, the third wall, the supplemental layer and the first outermost layer are fixed together by sewing.

25. The inflatable product as claimed in claim 23, further comprising a resilient layer wherein the resilient layer is disposed between the first outermost layer and the inflatable chamber; the trim sheet partially wraps around the first wall, the third wall, the supplemental layer and the first outermost layer; and the trim sheet, the first wall, the third wall, the supplemental layer and the first outermost layer are fixed together by sewing.

26. The inflatable product as claimed in claim 23, further comprising an auxiliary sheet and a resilient layer wherein the resilient layer is disposed between the first outermost layer and the inflatable chamber; the auxiliary sheet is fused with the third wall; the trim sheet partially wraps around the auxiliary sheet, the supplemental layer and the first outermost layer; and the trim sheet, the auxiliary sheet, the supplemental layer and the first outermost layer are fixed together by sewing.

27. The inflatable product as claimed in claim 23, further comprising a resilient layer wherein the resilient layer is disposed between the first outermost layer and the inflatable chamber; the trim sheet partially wraps around the first wall, the supplemental layer and the first outermost layer; and the trim sheet, the first wall, the supplemental layer and the first outermost layer are fixed together by sewing.

28. The inflatable product as claimed in claim 27, wherein the trim sheet and the third wall are integrally formed as one continuous piece.

29. The inflatable product as claimed in claim 27, wherein the supplemental layer comprises netting.

30. The inflatable product as claimed in claim 27, wherein the supplemental layer, the resilient layer and the first outermost layer are fixed together by sewing.

31. The inflatable product as claimed in claim 30, further comprising another strap which connects to the second wall and the third wall and comprises an edge wherein the edge is not directly connected to the third wall at a corner of the inflatable chamber.

32. The inflatable product as claimed in claim 30, further comprising another strap which connects to the first wall and the third wall and comprises an edge wherein the edge is not directly connected to the third wall at a corner of the inflatable chamber.

33. The inflatable product as claimed in claim 27, further comprising a second outermost layer wherein the second outermost layer covers the third wall; the trim sheet further partially wrap around the second outermost layer; and the trim sheet is further fixed to the second outermost layer by sewing.

34. The inflatable product as claimed in claim 33, wherein the second outermost layer and the third wall are glued together.

35. The inflatable product as claimed in claim 27, further comprising a second outermost layer wherein the second outermost layer covers the third wall; and the trim sheet and the second outermost layer are integrally formed as one continuous piece.

36. The inflatable product as claimed in claim 35, wherein the second outermost layer and the third wall are glued together.

37. An inflatable product comprising:
an inflatable chamber;
a first supplemental layer fixed to the inflatable chamber by sewing;
a strap;
a second supplemental layer; and
a trim sheet;
wherein the inflatable chamber comprises a first wall, a second wall and a third wall, and the third wall is connected between the first wall and the second wall;
wherein the strap is disposed in the inflatable chamber and connected to the first wall and the second wall;
wherein the first wall is pulled by the strap to form at least one first depression when the inflatable chamber is inflated;
wherein the first supplemental layer is placed to cover the first depression;
wherein the second supplemental layer covers the second wall and is fixed to the inflatable chamber by sewing;
wherein the second sheet, the third wall and the second supplemental layer are partially covered by the trim sheet; and the trim sheet, the second sheet, the third wall and the second supplemental layer are fixed together by sewing.

38. The inflatable product as claimed in claim 37, wherein the second supplemental layer comprises netting or a fabric layer.

39. An inflatable product comprising:
an inflatable chamber;
a supplemental layer fixed to the inflatable chamber by sewing;
a trim sheet;
wherein the inflatable chamber comprises a fusion line; the supplemental layer is connected to the fusion line by sewing threads; and the sewing threads coincide with the fusion line;
wherein the fusion line is covered by the trim sheet.

40. The inflatable product as claimed in claim 39, wherein the supplemental layer comprises netting or fabric.

41. The inflatable product as claimed in claim 39, wherein the fusion line comprises an outer edge and an inner edge closer to an interior of the inflatable chamber than the outer edge; and the sewing threads are at least 2.5 mm away from the inner edge of the fusion line.

42. The inflatable product as claimed in claim 39, wherein the trim sheet is fixed to the inflatable chamber by the sewing threads.

43. An inflatable product comprising:
an inflatable chamber;
a supplemental layer fixed to the inflatable chamber by sewing;
an air permeable layer;
another inflatable chamber on which the air permeable layer is disposed, wherein the supplemental layer and the air permeable layer are sewed together.

44. The inflatable product as claimed in claim 43, wherein the inflatable chambers comprises a fusion line; and a location where the supplemental layer and the air permeable layer are sewed together is away from the fusion line.

45. An inflatable product comprising:
an inflatable chamber;
a supplemental layer fixed to the inflatable chamber by sewing;
another inflatable chamber and a trim sheet wherein the inflatable chambers comprises a plurality of edge portions covered by the trim sheet; and the edge portions and the trim sheet are connected by sewing threads.

46. The inflatable product as claimed in claim 45, wherein the inflatable chambers further comprises a fusion line; and the sewing threads coincide with the fusion line.

47. An inflatable product, comprising:
an inflatable chamber comprising a first wall, a second wall, and a third wall connected between the first wall and the second wall;
a strap disposed in the inflatable chamber and connected to the first wall and the second wall;
a trim sheet;
a resilient layer;
a first outermost layer;
wherein the first wall is pulled by the strap to form at least one first depression when the inflatable chamber is inflated;
wherein the resilient layer is disposed between the first outermost layer and the inflatable chamber to cover the first depression;
wherein the trim sheet partially wraps around the first wall, the third wall, and the first outermost layer;
wherein the trim sheet, the first wall, the third wall, and the first outermost layer are fixed together by sewing.

* * * * *